United States Patent [19]

Stephens

[11] Patent Number: 4,471,379
[45] Date of Patent: Sep. 11, 1984

[54] CODIFIED FIELD POLARITY TELEVISION SYSTEM

[75] Inventor: Kenneth D. Stephens, Corozal

[73] Assignee: Focus Communications, Inc., Nashville, Tenn.

[21] Appl. No.: 292,399

[22] Filed: Aug. 13, 1981

[51] Int. Cl.³ ............................................... H04N 7/16
[52] U.S. Cl. .................................... 358/120; 358/121; 358/124; 358/144
[58] Field of Search ................. 358/120, 121, 124, 144

[56] References Cited

U.S. PATENT DOCUMENTS

| | | | |
|---|---|---|---|
| 3,069,492 | 12/1962 | D'Agostini . | |
| 3,736,369 | 5/1973 | Vogelman et al. . | |
| 3,801,732 | 4/1974 | Reeves . | |
| 3,890,461 | 6/1975 | Vogelman et al. | 358/117 |
| 3,919,462 | 11/1975 | Hartung et al. | 358/124 |
| 3,924,059 | 12/1975 | Horowitz | 358/124 |
| 3,936,594 | 2/1976 | Schubin et al. | 358/144 |
| 4,081,832 | 3/1978 | Sherman | 358/121 |
| 4,295,155 | 10/1981 | Jarger et al. | 358/120 |
| 4,319,273 | 3/1982 | Nossem . | |
| 4,336,553 | 6/1982 | Toonder et al. | 358/120 |

*Primary Examiner*—S. C. Buczinski
*Attorney, Agent, or Firm*—Lyon & Lyon

[57] ABSTRACT

There is disclosed herein a television system wherein television signals are scrambled or otherwise encoded at the transmitting facility and then unscrambled or decoded at the receiving facility, typically a home television subscriber. The television signals have a number of video fields inverted as transmitted, and these fields are reinverted by the home decoder. The normal sync pulses of a television signal are replaced with burst flags coded in the video portion of the signal. The decoder senses these burst flags and recreates conventional sync so that a composite video signal can be provided to the television receiver. The system includes a relatively simple string of decade counters and associated logic for determining which video fields are to be reinverted. The decoder is switchable, as with a suitable card or switches, to set the same for properly decoding the video. If a card is used, it may be any of various forms, such as a punched card, magnetic card or capacitive card, and such cards contain subscriber identification and different cards can be provided for a number of tiers of programming, such as normal monthly programming, sporting events, first run movies and the like. This system provides enhanced security and minimizes the chance that one subscriber's card can properly operate another subscriber's decoder. Furthermore, the system can provide audio in a form for direct reception by an FM receiver, has audio FM stereo capability, and enables audio coding and decoding to allow full stereo or a barker channel so that audio can be unintelligible to a nonsubscriber but still allow reception by the nonsubscriber of barker information.

28 Claims, 33 Drawing Figures

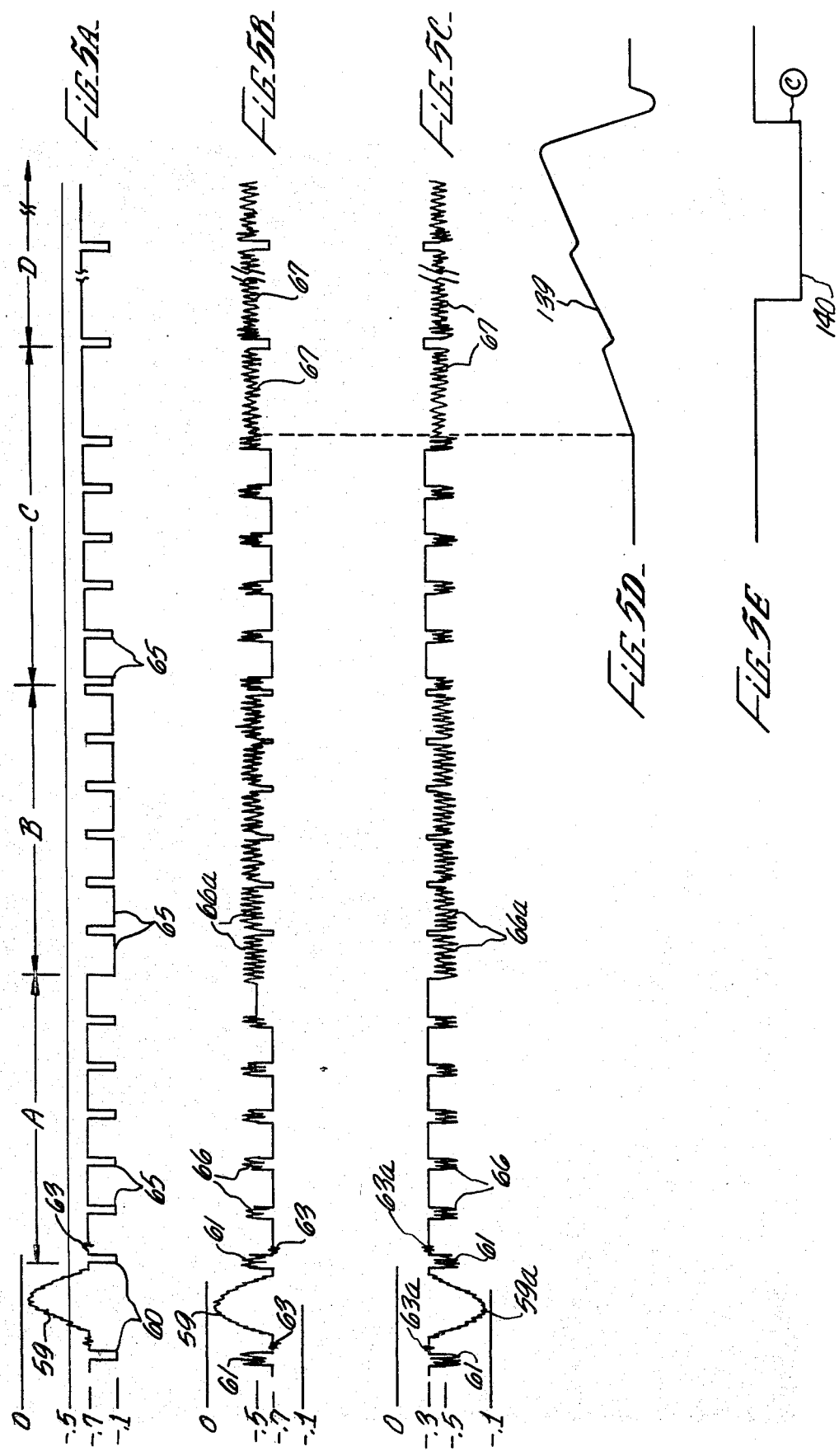

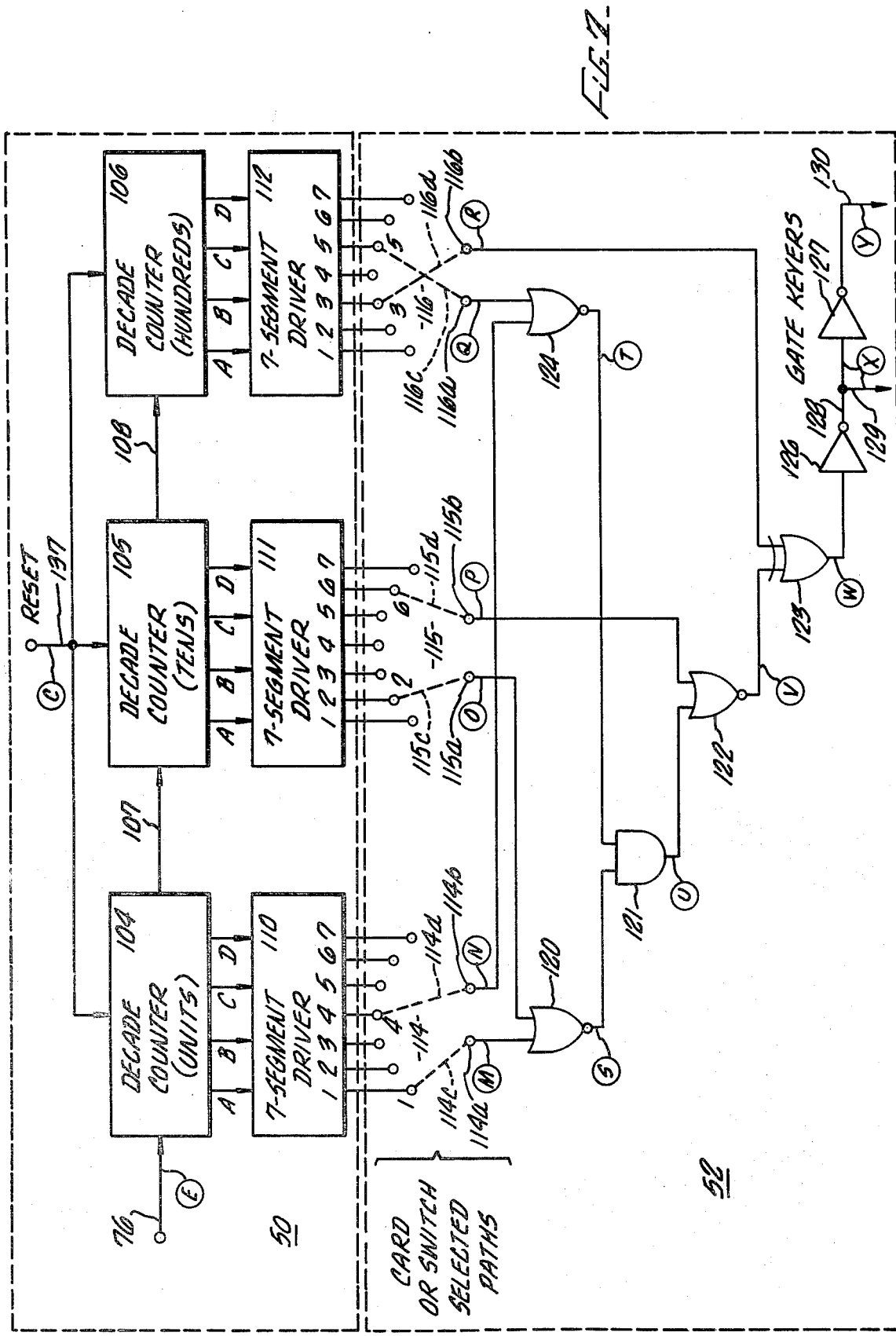

SUBSCRIBER CODE  B F D E G I
TIER      CODE  1 4 2 6 5 3

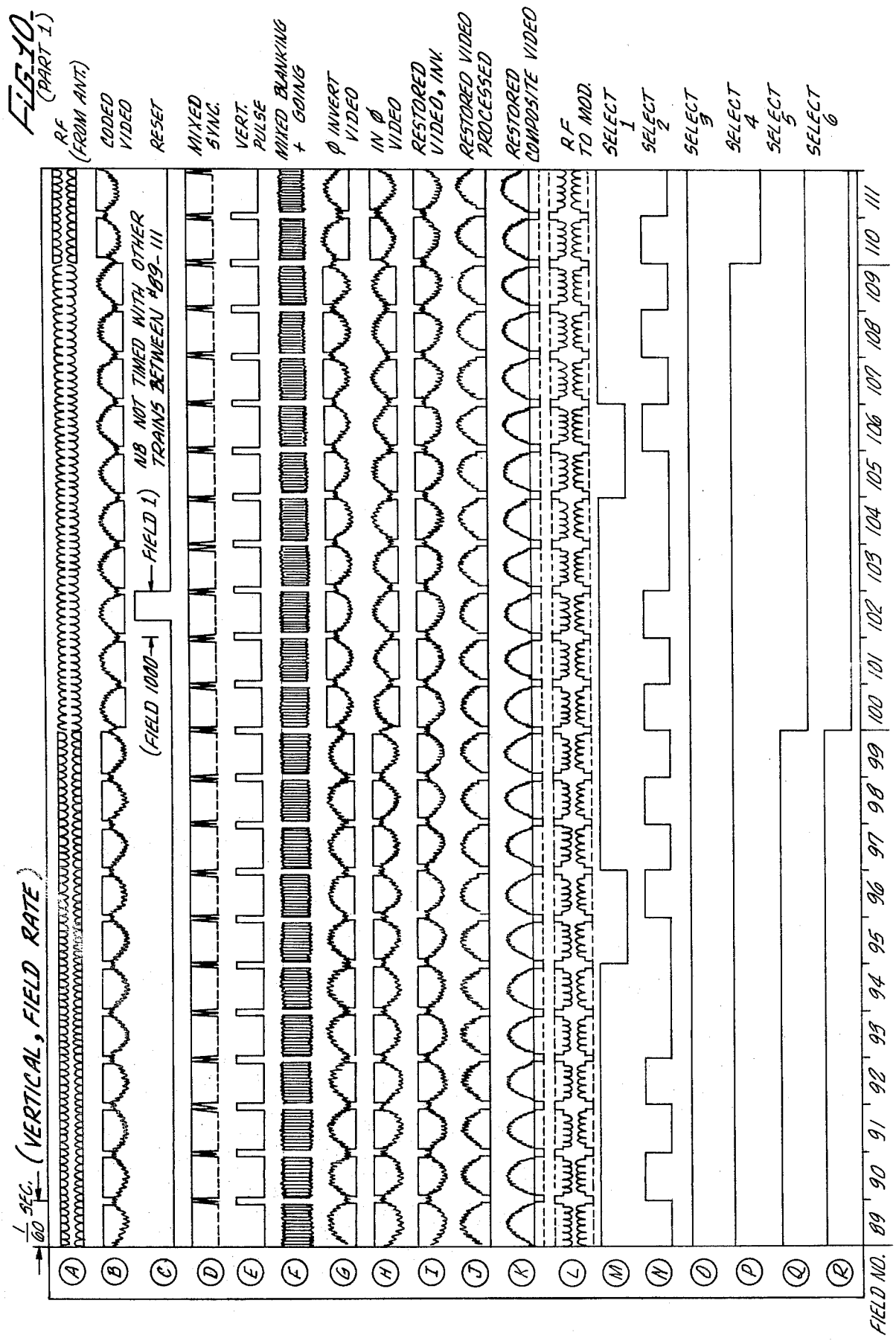

(PART B)

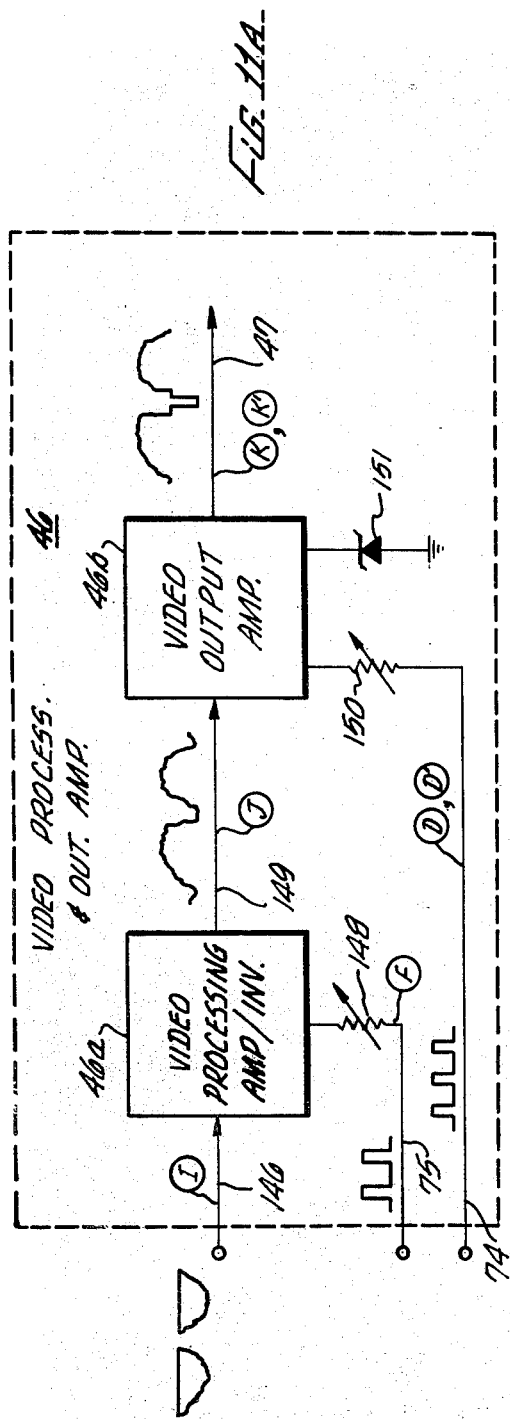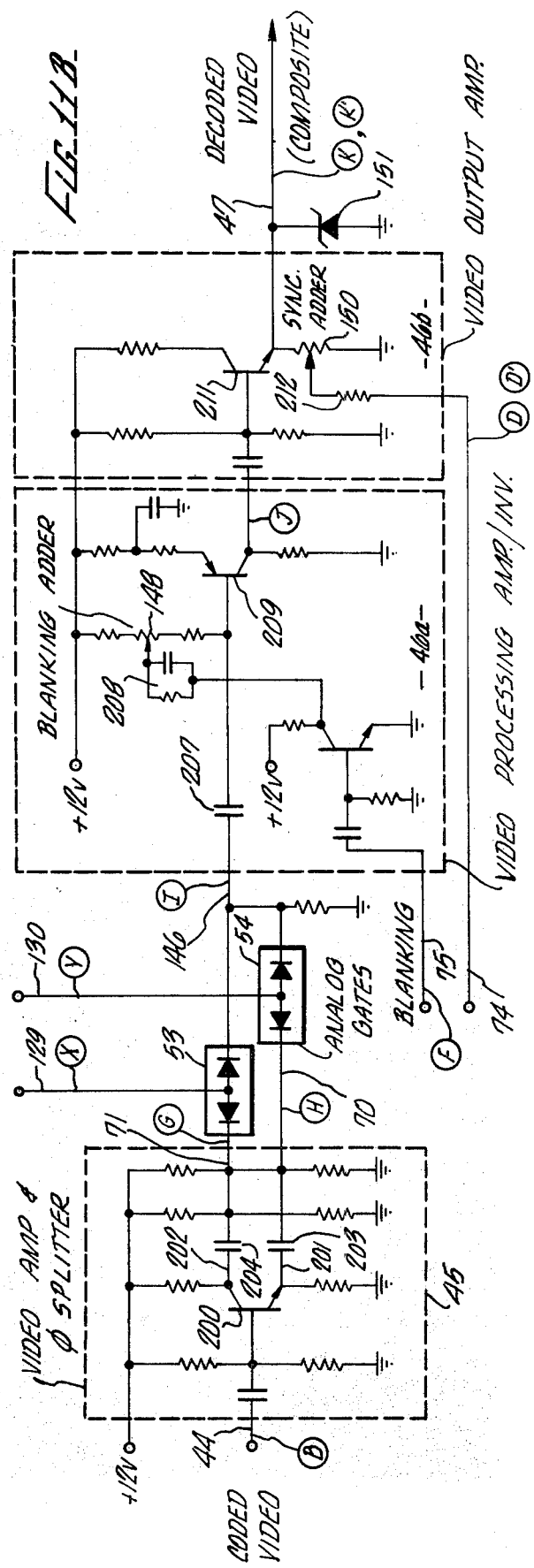

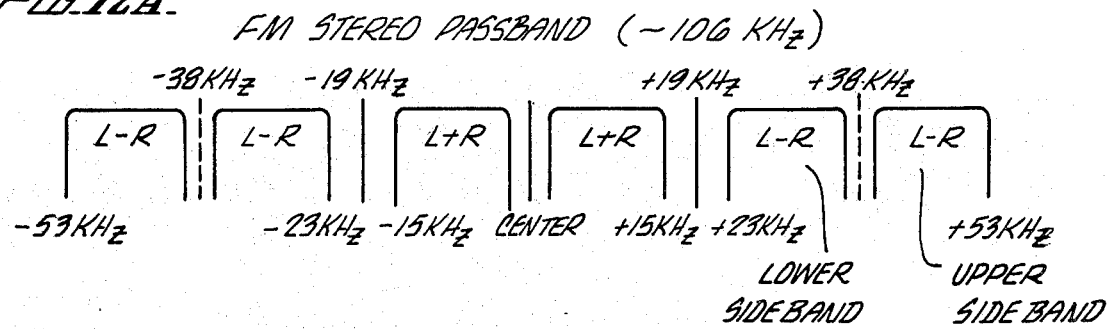
Fig. 12A. FM STEREO PASSBAND (~106 KHz)
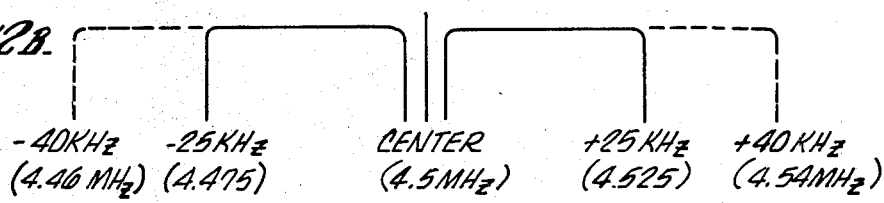
Fig. 12B. TELEVISION FM AUDIO PASSBAND (~50 KHz)
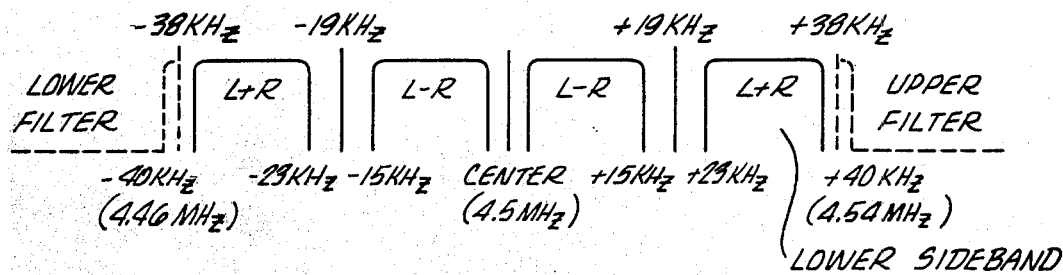
Fig. 12C. STV STEREO TV PASSBAND (80 KHz PASSBAND)
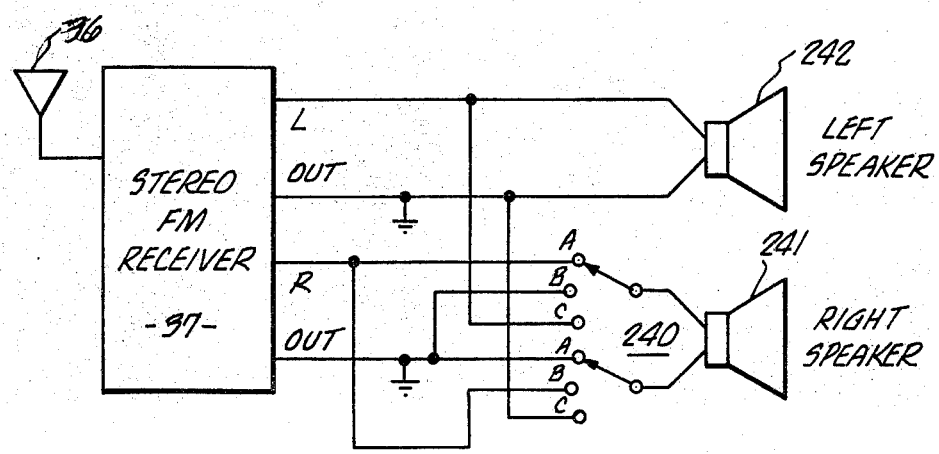
Fig. 12D.

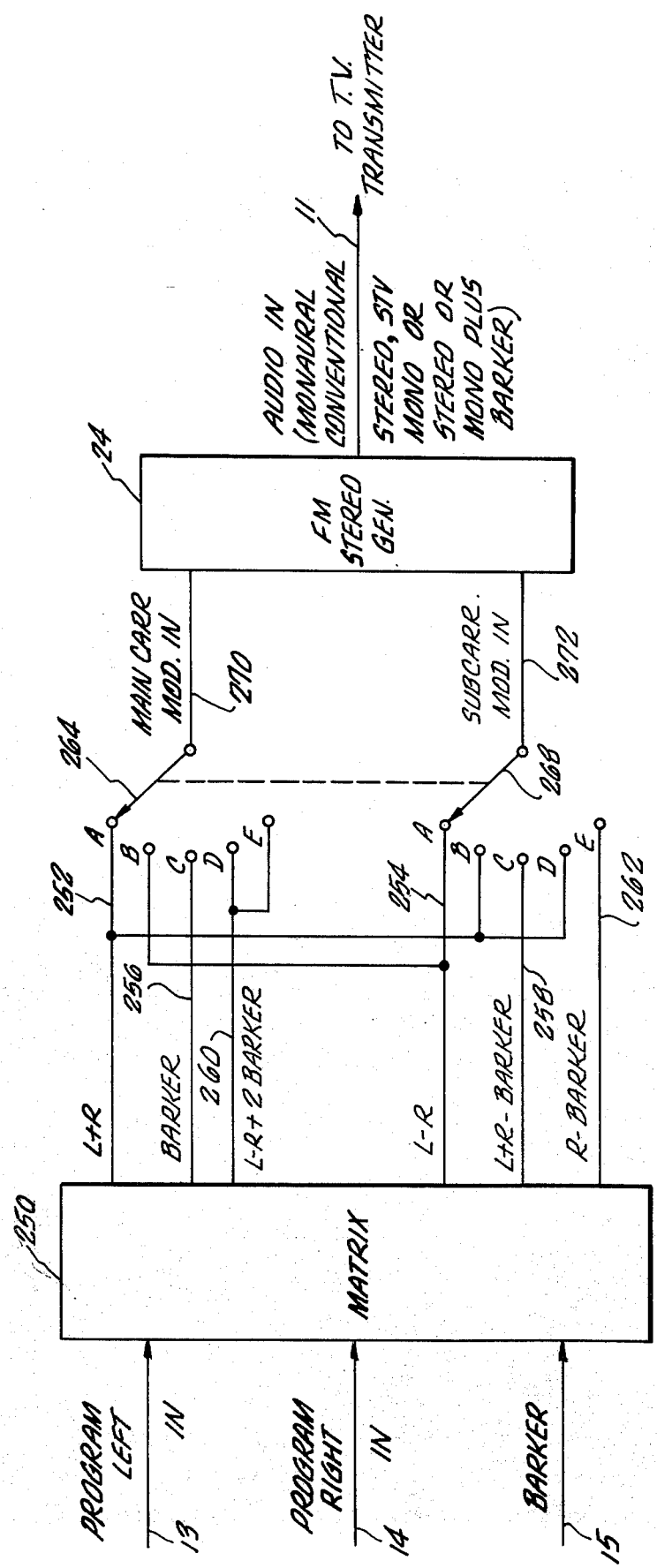

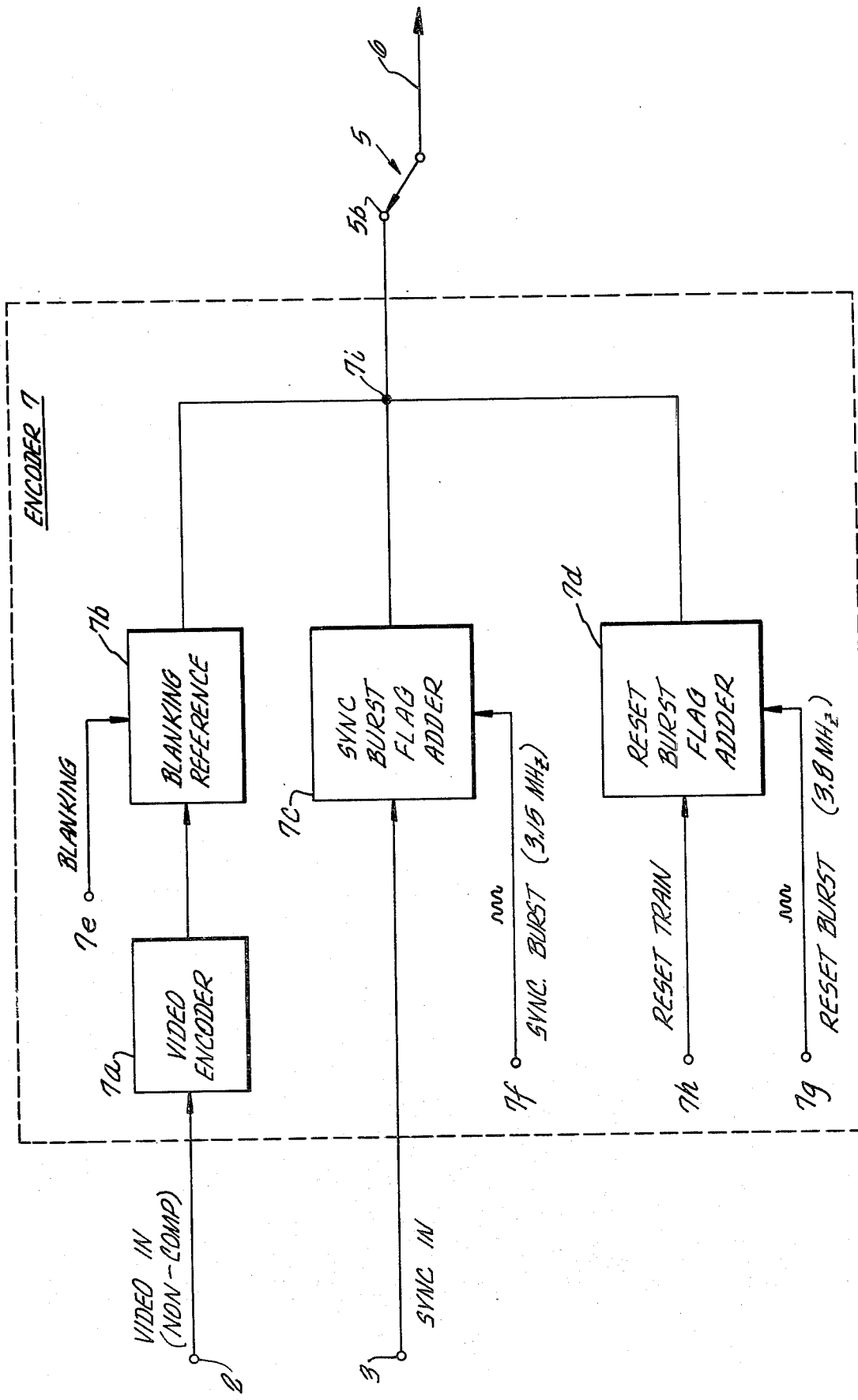

CODIFIED FIELD POLARITY TELEVISION SYSTEM

Subscriber's decoder. Furthermore, the system can provide audio in a form for direct reception by an FM receiver, has audio FM stereo capability, and enables audio coding and decoding to allow full stereo or a barker channel so that audio can be unintelligible to a nonsubscriber but still allow reception by the nonsubscriber of barker information.

BACKGROUND OF THE INVENTION

The present invention relates to television systems and more particularly to television transmitting and receiving systems involving codified signals of the type useful for subscription television use. While the present system will be described in the environment of conventional television broadcasting and home television reception, it likewise is applicable to satellite television systems, cable television systems and the like.

Numerous systems and approaches to subscription television and other forms of scrambled video have been proposed, tested and used. Some systems use a relatively sophisticated decoder for unscrambling the television signals and which does not require any form of decoding card, or hardwire control from a remote facility, for setting the decoder to properly perform its function. Some of these systems are addressable over the air to enable different tier programming. While these forms of systems do not require any card control or hardwire connection (e.g., a telephone line connection for addressing the decoder), they lack high security inasmuch as the electronic system of the decoder can readily be copied. Other systems have been proposed which involve complicated over the air addressing schemes to address and set each subscriber's decoder. These are subject to the problem of nonreceipt or improper receipt of the addressing code and the attendant maintainance problems, such as described in U.S. Pat. No. 4,081,832. Numerous other systems which have been proposed are relatively complicated or require hardwire addressing schemes, such as noted in U.S. Pat. No. 3,069,492. Other examples of prior systems are discussed in U.S. Pat. No. 3,801,732 which describes a scrambled television system involving the use of a punched card and in which both video and sychronizing information are altered in a predetermined manner, and U.S. Pat. No. 3,736,369 and No. 3,890,461 which describe ticket or card operated subscription television systems.

It has been the objective of workers in this field to provide a codification or scrambling system which is secure and difficult to pirate, provide a relatively inexpensive system inasmuch as a major use will be by individual home subscribers thereby necessitating production of a substantial number of decoders, provide a system which is easy to use and which enables a number of tiers of programming to be provided, and to provide a system which also includes codification of audio but which still can enable good audio reception and barker information.

SUMMARY OF THE INVENTION

According to the present invention and exemplary embodiments thereof described herein, an improved form of codified television system is provided. In a preferred form, field polarity is codified such that a selected number of fields out of a given number of fields (e.g., 1000) are inverted and transmitted, and the inverted fields are reinverted in the decoding process. Additionally, the standard sync pulses are eliminated and are replaced with burst flags of similar duration encoded in the video portion of the signal. This provides additional security, but also enables the reception of a signal with more contrast and greater dynamic range because certain modulation constraints are reduced. A decoder used by the home subscriber receives the encoded video signals and recreates standard sync pulses. A relatively simple counting technique using decade counters and drivers is employed for determining which video fields are to be reinverted. After the transmitted inverted fields are reinverted, sync is combined with this video train to provide a composite video output which is fully restored and decoded and is ready for reception and use by the television receiver. The decoding process, in a preferred embodiment, uses a card for month, tier of programmimg, subscriber number and/or any other desirable information to appropriately set the counting and decode logic portion of the system for performing the reinversion process. Through use of a card system, subscriber billing can be simple and relatively foolproof, as contrasted to unreliable subscriber address systems. The subscriber, wishing a particular tier or tiers of programming for a specific period, simply pays the appropriate fee and receives the appropriate decoding card for each service. Furthermore, the system enables the transmission of audio FM stereo as well as monaural and barker information, and the encoded audio can be provided from the decoder system directly to a home FM stereo audio system.

Accordingly, it is an object of the present invention to provide an improved form of codified television system.

Another object of this invention is to provide a codified television system employing relatively simple and inexpensive decoding logic.

A further object of the present invention is to provide an improved form of card-controlled decoding system for codified television signals.

Another object of the present invention is to provide a codified television system involving an improved form of audio system.

BRIEF DESCRIPTION OF THE DRAWINGS

These and other objects and features of the invention will become better understood through a consideration of the following description taken in conjunction with the drawings in which:

FIG. 4 shows expanded or enlarged waveforms (lower half of envelope) similar to FIG. 3 wherein

FIG. 5 shows similar waveforms but for the vertical interval, wherein FIG. 5a illustrates a standard vertical interval, FIG. 5b shows a codified vertical interval, FIG. 5c shows a codified inverted vertical interval, FIG. 5d shows codified reset burst detection, and FIG. 5e shows reset pulse forming;

FIG. 7 is a block diagram of decade counters and drivers, and the decode switching and logic, used in the system of FIG. 2 for determining which video fields are to be reinverted;

FIGS. 11A and 11B respectively illustrate a block diagram of a video processing and output amplifier of FIG. 2, and a exemplary form of circuit diagram therefor;

FIGS. 12A–12C illustrate several FM and television audio passbands, FIG. 12D shows a receiver switching technique for use in the audio receiver part of the present system, and FIGS. 12E–12G show additional exemplary audio encoding and decoding techniques which can use an FM receiver adapted to directly receive and decode the audio portion of the transmitted signals; and FIG. 13 is a block diagram of the encoder of the transmitting system of FIG. 1.

DESCRIPTION OF PREFERRED EMBODIMENTS

Figure 1:
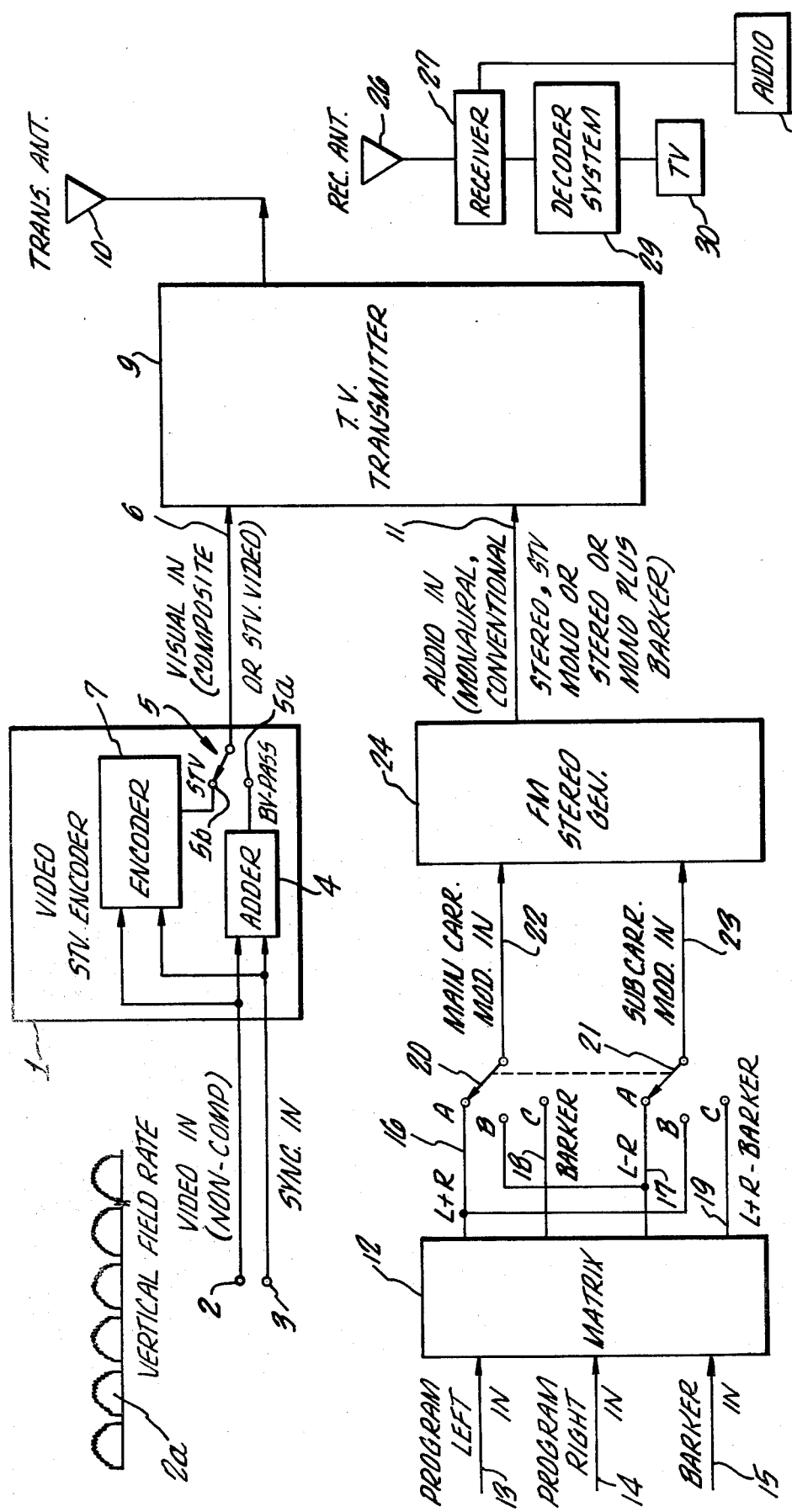
FIG. 1 is a generalized block diagram of the television system of the present invention including transmitter system and receiver system for transmitting and receiving the codified television signals and retrieving therefrom normal composite video and FM stereo audio for playback of the video on a standard television receiver and the audio on a standard FM stereo receiver.

Turning now to the drawings, and first to FIG. 1, the same illustrates in general block diagram form a transmitting and receiving system incorporating the concepts of the present invention. The system, and its construction and operation, will be discussed in the environment of a conventional television broadcast and receiving system; however, it should be understood that the concepts of the present invention are applicable to scrambled television transmissions via satellite, microwave, cable or other means. After a discussion of the overall system, a detailed description of the receiving and decoding system and operation will be provided which will provide a full understanding of both the encoding and decoding processes.

The basic system includes a video STV encoder 1 which receives noncomposite video 2a on input 2 and standard sync on input 3. These are the conventional video signals normally used in broadcast. The video 2a is like the waveform shown in FIG. 10J since the waveform of FIG. 10J is a decoded and restored form of the video 2a. These inputs are applied to an adder 4 within the encoder 1, and the adder 4 inserts sync into the video to provide composite video out for standard broadcasts. The output of the adder goes to a switch 5 which when connected to lower terminal 5a provides the standard composite video output on an output 6 and when connected to an upper terminal 5b provides STV or encoded video on the output 6. Additionally, the video and sync signals from inputs 2 and 3 are applied to a video encoder 7 which inverts selected video fields, and in response to standard sync from line 3 inserts sync and reset burst signals which, as will appear subsequently, respectively provide burst flags in the video to replace the normal horizontal sync and burst flags in selected vertical intervals for a decoder reset function. This encoded video is used for subscription television broadcasts (STV) and is applied through the upper terminal 5b of the switch 5 to the output 6. The construction and operation of the encoder 1 is relatively straightforward and will become readily apparent to those skilled in the art after a study of the transmitted waveforms and discussion of the operation of the decoder which will follow later. Selected video fields are inverted with an analog inverter under control of a counter, and burst flags are inserted in a manner like insertion of the sync color burst. A further description of the encoder will be provided later with reference to FIG. 13.

The standard composite video or the encoded video is applied from the output line 6 to a conventional television transmitter 9 which has a transmitting antenna 10. The transmitter 9 likewise receives audio information on an input 11 which is transmitted in a conventional manner but the audio passband may be different from standard.

The present system also enables monaural and stereo audio transmissions, as well as barker information (detectable and recognizable audio even when the video picture is scrambled at the receiver), which are transmitted in a substantially conventional manner but may be at a slightly different carrier frequency than the present 4.5 MHz FM audio. For this purpose, a suitable matrix circuit 12 receives an audio left channel program input at 13 and an audio right channel input at 14. A barker input is provided at 15. The matrix 12 can be a conventional matrix to suitably combine the inputs, and provide a left plus right output 16, a left minus right output 17, barker output 18, and left plus right minus barker output 19. These outputs are connected to ganged selector switches 20 and 21 which supply a main carrier modulator input on line 22 and a subcarrier modulator input on line 23 to an FM stereo generator 24 of conventional construction except for the use of different bandpass filters for the carrier frequency or frequencies used and as dictated by the FCC. When the selector switches 20-21 are in the A position, conventional stereo is provided to the generator 24. FM stereo is conventionally broadcast with L+R on the main carrier and L−R on the subcarrier, and these signals are applied to the generator 24 when the switches 20-21 are in the A position. When the switches 20-21 are in the B position, STV or encoded stereo is provided wherein L−R is on the main carrier and L+R is on the subcarrier. This allows full stereo to be received by subscribers (because of appropriate decoding), but on the other hand a distorted left minus right audio signal is received by nonsubscribers as will be explained subsequently. When these switches are in the C position, monaural audio is provided to subscribers and barker information is provided to nonsubscribers. The selectable inputs are supplied by lines 22 and 23 to the FM stereo generator 24 and to the main carrier modulator and subcarrier modulator sections therein. The output of the generator 24 is applied via the line 11 in a conventional manner to the audio input of the transmitter 9.

The transmitted television signals are received by a receiving antenna 26 of the receiving system shown in FIG. 1. This typically is one of many home receivers. It should be noted that the transmitter 9 may be an earth-to-satellite transmitter with the satellite operating as a repeater which repeats the incoming television signals and directs or redirects the same to the receiving antenna 26 which may, in this case, be a dish antenna pointed toward the satellite and may include an appropriate RF front end (downconverter and so forth) before confronting the receiver 27. The receiving antenna 26 is connected to a receiver 27, which, as will be explained in greater detail later, supplies the appropriate audio signals to a standard FM stereo receiver 28, and supplies appropriate video and sync signals to a decoder system 29 which, in turn, supplies full composite video to a conventional television receiver 30. The specific nature of the television signals, including video, horizontal sync, vertical interval and the like, as well as details of the receiving and decoding system and audio reception will be discussed later.

Figure 2:
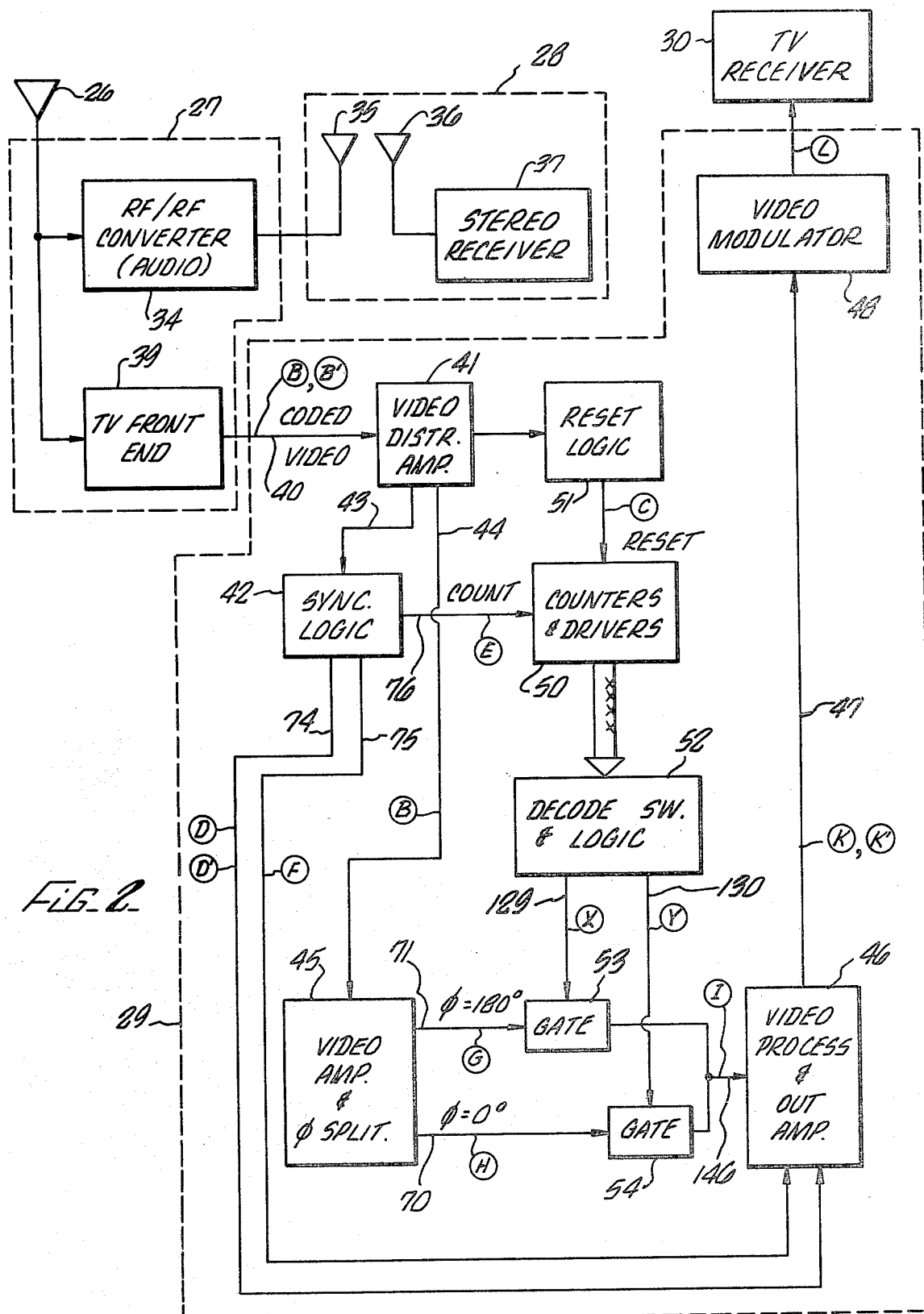
FIG. 2 is a basic block diagram of the video and audio receiving and decoding system.
Figure 10:
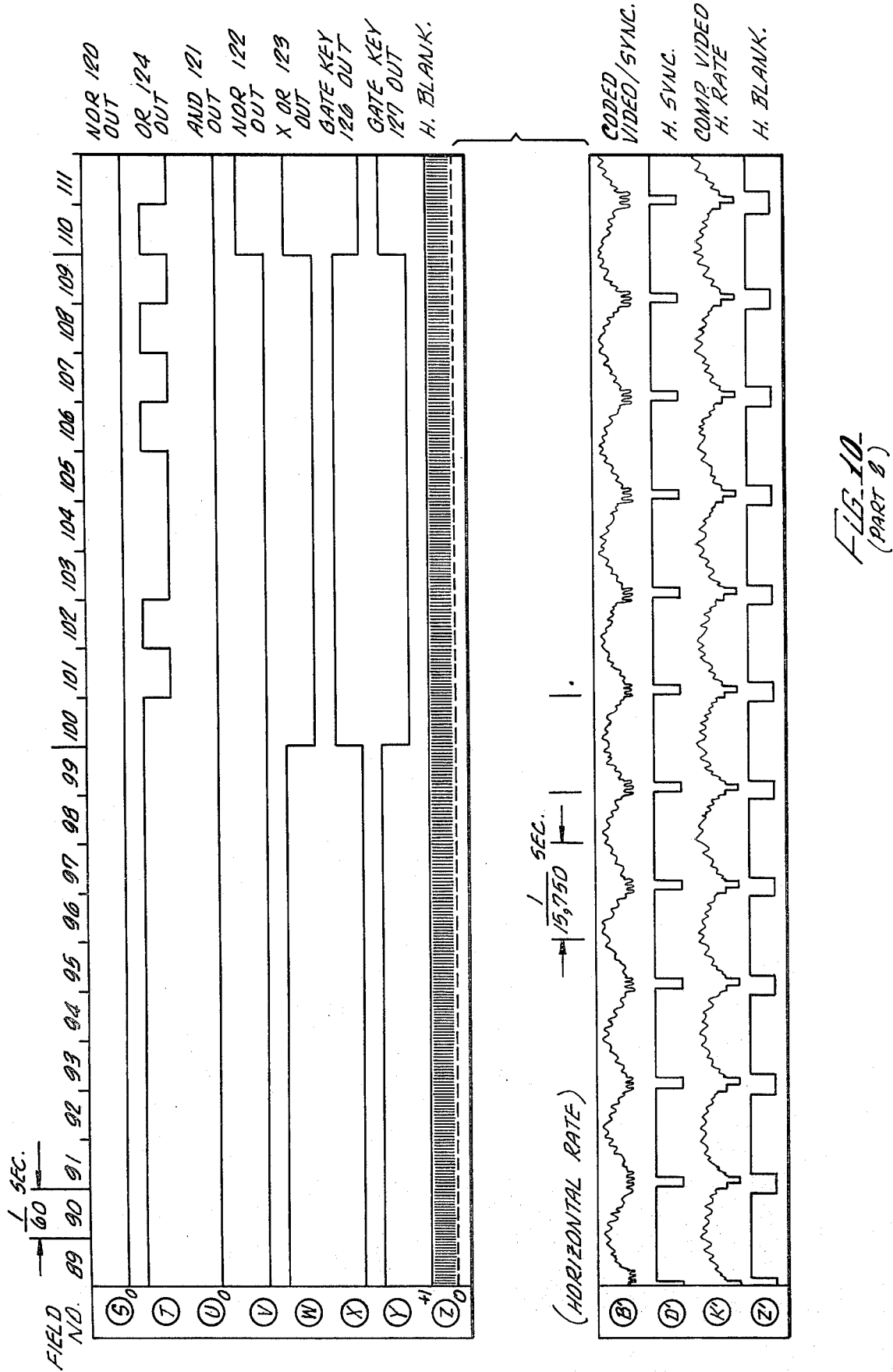
FIGS. 10A through 10Z' are simplified waveforms illustrating the various signals in the system of FIG. 2 and subsystems of FIGS. 6–8 and 11.

FIG. 2 is a more detailed block diagram of the receiver 27, decoder system 29, audio system 28, and television receiver 30. Further detailed block diagrams and circuits therefor are shown in FIGS. 6-8, 11 and 12, detailed waveforms are shown in FIGS. 3-5, and generalized waveforms for various locations in the block and circuit diagrams are shown in FIG. 10. The transmitted signal is received by the receiving antenna 26, and this antenna is connected to an RF/RF converter 34 for converting the audio portion of the transmitted signal to a selected frequency in the FM broadcast band. The principal purpose of the converter 34 in a preferred embodiment is to provide an audio output tuneable over the standard FM band of 88-108 MHz. This output is applied from the converter via a simple transmitting antenna 35 in the home and can be picked up by a receiving antenna 36 of a conventional stereo receiver 37 which comprises the audio section of the receiving system. This allows, as will be described in greater detail subsequently, monaural or codified stereo audio of high quality to be provided without a direct wire connection to a high quality FM stereo system for playback. The FM receiver is modified with an output switch to reverse loudspeaker connections to allow proper reproduction of codified stereo signals. Alternatively, instead of transmitting the audio, it can be hardwired to stereo receiver antenna input terminals from the RF/RF converter 34, the audio can be reinserted into the composite video signal in a conventional manner for application to the television receiver 30 and playback via its audio section, or an FM receiver can be provided which is directly tuneable to the audio portion of the transmitted signal to eliminate the necessity of a converter such as described below with reference to FIGS. 12F-12G.

The receiving antenna 26 of the receiving system also is connected to a television receiver front end 39 which includes standard RF, IF and discriminator circuits. The output of 39 on line 40 is codified or coded video and is applied to a video distribution amplifier 41. The output of the video distribution amplifier is connected by a line 43 to a sync logic circuit 42 for recovering and reforming suitable sync signals, and is connected via a line 44 to a video amplifier and phase splitting circuit 45. Briefly, the circuit 45 receives normal and inverted video fields, and logic and processing circuitry which will be described later reinverts the inverted video fields and reinserts sync so that the output of a video processing and output amplifier 46 on a line 47 is fully restored and processed composite video which in turn is applied via a video modulator 48 to the TV receiver 30. The logic and processing circuitry includes counters and drivers 50, reset logic 51, decoding switch and logic 52, analog gates 53-54 and the video processing and output amplifier 46. These several circuits will be explained in greater detail later after a discussion of the various waveforms involved which will facilitate an understanding of the purpose, construction, and operation of these various circuits. In the event the video signals are not codified, the system will then still process the video and pass it on to the modulator 48, resulting in highquality reception of that channel during such noncodified broadcasting. The channel also can optionally transmit highquality stereo audio.

Figure 3A:
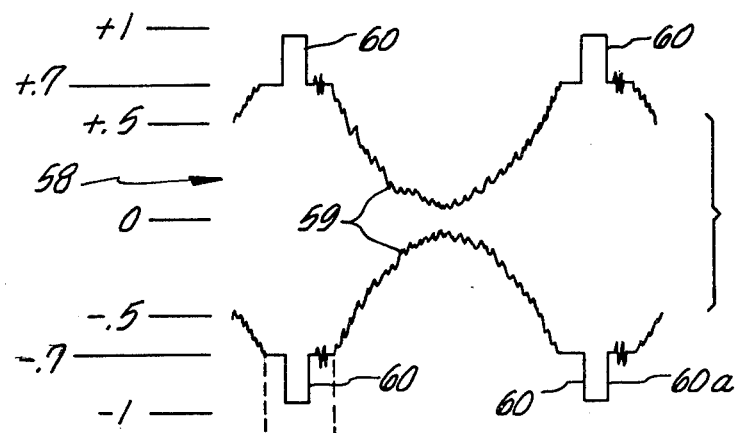
FIGS. 3a and 3b illustrate, respectively, a basic standard NTSC video waveform envelope with horizontal sync pulses, and a codified video waveform envelope with horizontal sync bursts according to the present invention.
Figure 3B:
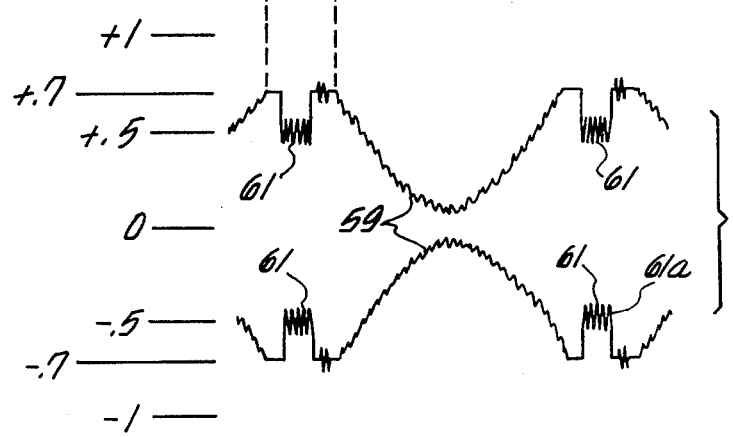

Turning now to FIG. 3, FIG. 3a illustrates a portion of an NTSC amplitude modulated RF carrier television signal showing the picture information at 59 (representing one TV line) and horizontal sync pulses at 60. On the other hand, FIG. 3b illustrates a codified RF carrier showing the same horizontal sychronizing interval and same picture information, but with sync bursts or sync burst flags 61 according to the present invention. It will be seen that these sync bursts 61 fall within the limits of the video envelope as distinguished from the substantial excursion of the horizontal sync pulses 60 of the NTSC waveform. This allows greater modulation of the picture information 59, since maximum modulation is not constrained by the large excursion of standard horizontal sync pulses, to thereby enable more contrast and more dynamic range potential or to enable a reduction in transmitter power.

Figure 4A:
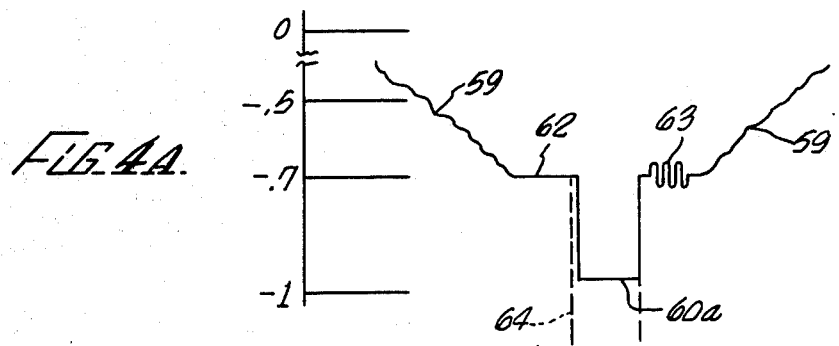
FIG. 4a shows a standard video signal with horizontal sync.
Figure 4B:
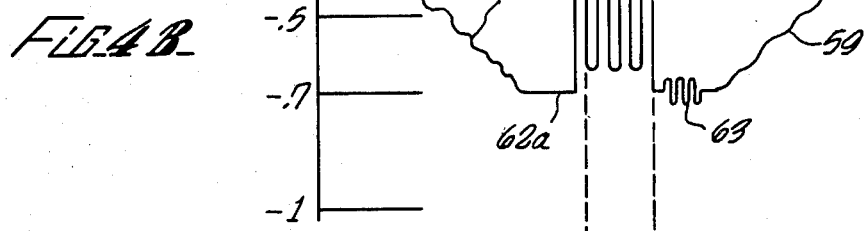
FIG. 4b shows encoded video and horizontal sync burst according to the invention.
Figure 4C:
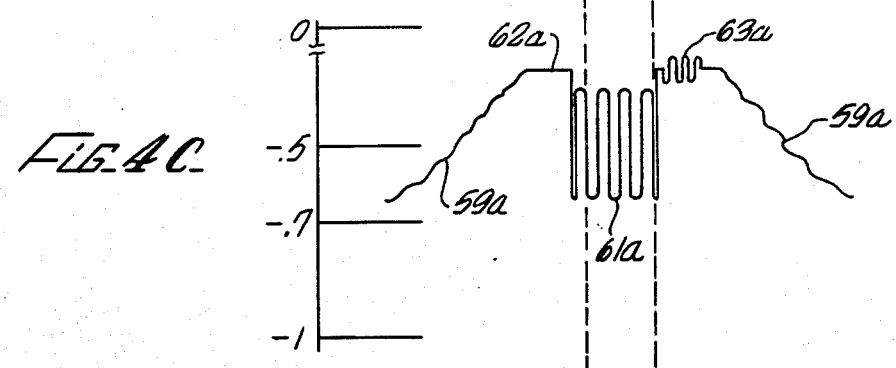
FIG. 4c shows encoded inverted video with horizontal sync burst according to the invention.

FIG. 4a is an expanded version of the conventional waveform of FIG. 3a near the horizontal sync pulse 60a, and FIG. 4b is a similar expanded version of the codified carrier of FIG. 3b near the sync burst 61a, and in each case only the lower half of the RF carrier envelope is shown for simplicity of illustration. In FIG. 4a, 59 again designates the picture information, and 60a designates the horizontal sync pulse. Additionally shown is the front porch 62 and color burst 63 in the back porch. FIG. 4b shows a similar waveform wherein the picture information 59 is the same, as is the color burst 63; however, the horizontal sync pulse 60a has been replaced with the sync burst 61a which begins slightly earlier than the horizontal sync pulse 60a as indicated by a dashed line 64. The front porch is illustrated at 62a, but in this case it is slightly shorter than the front porch 62 of the waveform in FIG. 4a because of the longer duration of the sync burst 61a. A typical sync burst may comprise approximately 15-20 cycles at, for example, 3.15 MHz, which are enough cycles to allow suitable detection and reforming of a standard sync pulse in the receiver. FIG. 4c shows the same waveform as FIG. 4b, but in this case, the video is inverted and therefore the picture information is designated by a different reference 59a as is the color burst 63a since both are inverted. Thus, the inverted color burst 63a is 180 degrees out of phase with the color burst 63. However, the sync bursts 61a in both of FIGS. 4b and 4c are the same and are in phase. The sync bursts are inserted after inversion of video fields; otherwise, if these bursts were inverted, a subscriber could detect their phase to enable ready detection of which video fields were inverted.

It should be noted that the encoded video waveform according to the present invention comprises codified noninverted waveforms (normal video with codified sync) like that shown in FIG. 4b (which only shows parts of two video lines) and codified inverted waveforms (inverted fields and codified sync) like that shown in FIG. 4c. Therefore, the resultant signal train is a codified composite waveform comprising non-inverted (normal) fields and inverted fields, as distinguished from lines. Furthermore, the sync bursts retain the same phase whether the field is inverted or not. A selected number (such as 400-600) of fields out of a given number (such as 1000) of fields are inverted.

It again should be noted that the waveforms in FIG. 4a-4c comprise only the lower half of the RF carrier envelope, as do most of the video waveforms shown and described herein, but the actual signal comprises a full envelope with upper and lower halves. Reference is made herein to "normal" video or fields, but this is not intended to be limited only to positive going video, and is intended to encompass either positive going or negative going video in a given STV system. Accordingly, references to inverted video are intended to mean that the video is inverted from the normal video (whether the video referred to as normal is positive going or negative going).

Figure 4D:
FIG. 4d shows sync burst detection.
Figure 4E:
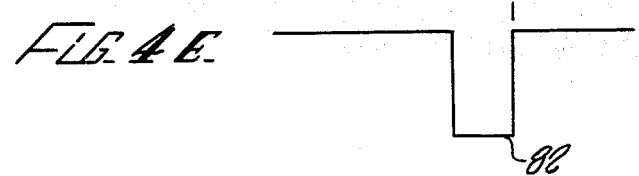
FIG. 4e shows encoded sync pulse forming.

As will be described subsequently, at the receiver the sync burst 61a is detected prior to field inversion to thereby reform suitable sync pulses, and the picture information 59a and color burst 63a are subsequently reinverted by the system to allow normal detection of both. FIGS. 4d and 4e show certain pulses involved in sync burst detection and sync pulse forming which will be discussed later.

FIGS. 5a through 5c depict waveforms similar in nature to those of FIGS. 4a through 4c, but in this case the vertical interval is involved. Thus, FIG. 5a shows a conventional NTSC vertical interval with picture information 59 (one line) and a color burst 63, as well as a first equalizing pulse interval A, a vertical synchronizing pulse interval B, a second equalizing pulse interval C, and vertical blanking pulses D. The various vertical pulses are designated by the reference numeral 65. FIG. 5b shows a similar vertical interval, but for codified video (non-inverted) according to the present invention. In FIG. 5b, the sync bursts of the vertical interval are shown at 66 and are of the same frequency as the horizontal sync bursts 61, and reset bursts which will be described later are shown at 67. Some of the vertical sync bursts 66a (in the synchronizing pulse interval B) are of longer duration to facilitate detection of the occurrence of the vertical interval. The reset bursts 67 have a frequency different from that of the sync burst, such as 3.8 MHz (and occur only once in approximately 1000 fields). The reset bursts are detected to develop a reset pulse for the counters 50, which are reset after a given number (such as 1000) of fields have been received by the receiver of FIG. 2. FIG. 5c basically is the same as FIG. 5b, but with the video and color bursts inverted, while the sync bursts 66 and 66a and the reset bursts 67 are in phase with those in the vertical interval of FIG. 5d since sync is detected before the video fields are reinverted as noted earlier.

Accordingly, FIGS. 3a, 4a, and 5a illustrate conventional NTSC waveforms, FIGS. 3b, 4b, and 5b illustrate similar waveforms but with sync codified according to the present invention, and FIGS. 4c and 5c illustrate waveforms similar to respective FIGS. 4b and 5b but with the video information (picture 59a and color burst 63a) inverted while the sync and reset bursts 66, 66a and 67 have the same phase in FIGS. 4b-4c and 5b-5c. As will be described in more detail later, the sync logic 42 of FIG. 2 and in FIG. 6 detects the sync bursts to reform the horizontal sync pulses and the vertical sync pulses, and the decoding system determines which fields are to be reinverted so that all the fields will have the proper polarity or sense when reformed sync is reinserted so as to form the composite video output for the television receiver.

Figure 6:
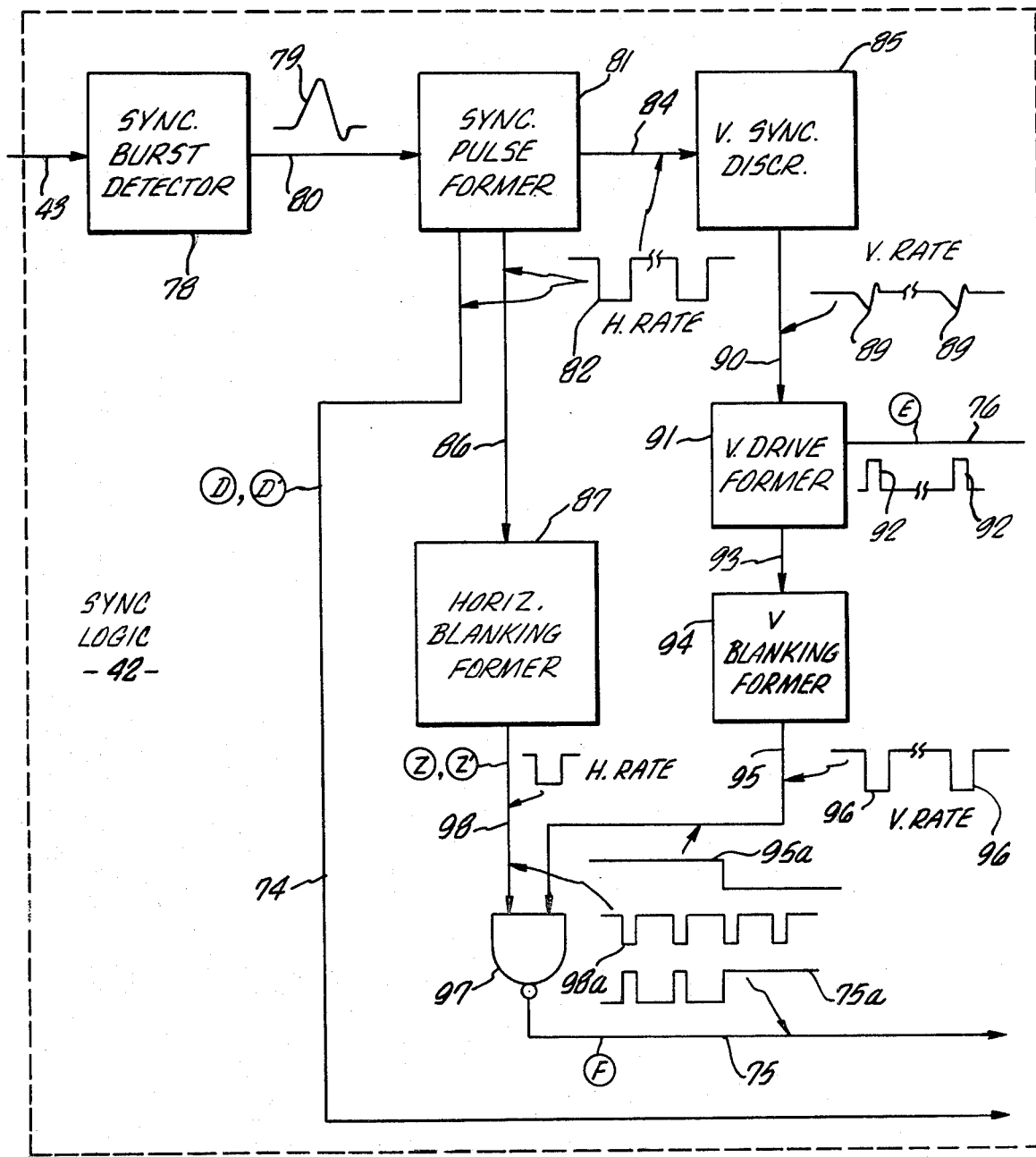
FIG. 6 is a block diagram of the sync logic of the system of FIG. 2 for recovering sync from the burst flags.
Figure 1A:
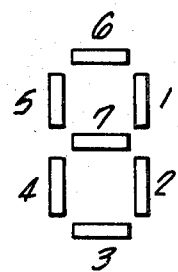

Turning again to the block diagram of FIG. 2, as well as to the more detailed block diagram in FIG. 6 of the sync logic 42, the TV front end 39 functions in a conventional manner as described previously and provides a coded video out on its output 40. This coded video could, for some broadcasts, comprise the standard NTSC signals of FIGS. 3a, 4a, and 5a if the receiving system includes conventional sync detection, but that is not shown in the present drawings so as to eliminate confusion about the present system. Thus, the coded video on line 40 will comprise the codified waveforms as shown in FIG. 3b, FIGS. 4b-4c and FIGS. 5b-5c depending on whether video fields are inverted or not. FIGS. 10A and 10B illustrate, respectively, the RF envelope from the antenna (10A) and coded video (10B) and at the 60 Hz field rate, and fields 89-99 are negative-going, fields 100-109 are inverted (positive-going) with respect to fields 89-99, and fields 110-111 are negativegoing (not inverted with respect to fields 89-99). Thus, FIG. 10B shows an example waveform at the field rate applied from the TV front end 39 via the line 40 to the video distribution amplifier 41. FIG. 10B' shows a portion of waveform 10B but at the horizontal rate and thus the same is expanded. It should be noted that FIG. 10 shows the various waveforms in generalized form throughout the system, whereas FIGS. 4 and 5 show the waveforms in more detail.

The video distribution amp 41 amplifies the coded video and applies an amplified version to the video amplifier and phase splitter 45, the outputs of which are in-phase codified video on line 70 and 180 degrees out-of-phase codified video on line 71. The analog gates 53 and 54 then gate through either an in-phase (if the originally transmitted field is a normal one) or an out-of-phase (if the originally transmitted field was inverted) field to provide as an output normal video fields and subsequently allow proper composite video to be reformed. The operation of the gates 53 and 54 occurs under the control of the decoding logic of the system. Before describing the decoding logic in detail, the detection and reforming of horizontal and vertical sync will be described.

The coded video is applied from the video distribution amplifier 41 via the line 43 to the sync logic 42. This sync logic provides reformed horizontal and vertical, or mixed, sync on an output line 74 to the video processing and output amplifier 46, provides blanking on a line 75 to the video processing and output amplifier 46, and provides vertical pulses on an output line 76 to the count input of the counters and drivers 50 which in turn count the video fields to enable a determination to be made of which fields are to be reinverted. FIG. 6 is a detailed block diagram of the sync logic 42.

Considering the sync logic 42 of FIG. 6 in more detail, the amplified codified video from the line 43 is applied to a sync burst detector 78 which detects the sync bursts 61 (FIG. 4b-4c) and provides an output pulse 79 on an output line 80 for each such sync burst. The pulse 79 and its relationship with respect to the sync burst 61 are illustrated in detail in FIG. 4d. The sync burst detector 78 is a high Q tuned amplifier for the frequency used for the sync burst, and in the present example, is a high Q 3.15 MHz amplifier. The pulse 79 is applied to a sync pulse former 81 which merely forms a suitably shaped pulse 82 like a conventional NTSC horizontal sync pulse. This pulse former 81 can be a one-shot multivibrator or preferably several sections of a hex inverter in series. Thus, it merely reforms horizontal and vertical sync pulses. The waveform of the mixed sync pulses on the output line 74 of the former 81 is shown in FIG. 10D at this field rate, and an expanded version at the horizontal rate is shown in FIG. 10D'. These pulses also are applied by a line 84 to a vertical sync discriminator 85 and by a line 86 to a horizontal blanking former 87.

The vertical sync discriminator 85 is an RC circuit which looks at the extended or long sync bursts 66a (FIGS. 5b–5c) and provides output pulses 89 at the vertical rate. These pulses are applied by a line 90 to a vertical drive former 91 which also can be a one shot multivibrator or hex inverter to provide suitably shaped pulses 92 which occur at the vertical rate, and typically the pulses 92 will have an amplitude excursion from zero to the maximum circuit voltage Emax. Example pulses 92 are shown in FIG. 10E. These pulses 92, as will be described later, are applied to the counters and drivers 50 (FIG. 2) to allow counting of the incoming video fields. They also are applied by a line 93 to a vertical blanking former 94 which provides on an output 95 reconstituted or reformed vertical pulses 96 at the vertical rate. The former 94, as will be apparent, makes the pulses 92 wider so as to provide a conventional form of vertical blanking pulses. The pulses 96 are applied by the line 95 to one input of a Nand gate 97.

Returning to the sync pulse former 81, the sync pulses 82 from the sync pulse former 81 are applied by the line 86 to the horizontal blanking former 87 as noted above, and the horizontal blanking former 87 follows the sync pulses 82 and provides as an output on a line 98 horizontal blanking as depicted by the waveforms in FIG. 10Z and 10Z'. The waveform of FIG. 10Z appears like a continuous high level because it is shown at the vertical field rate, but actually is composed of the pulses shown in FIG. 10Z' which shows these pulses at the horizontal rate. If desired, the color burst can be blanked out and recreated in the conventional manner. If it is not desired to regenerate the color burst, then horizontal blanking pulses (Z,Z') should terminate before the start of color burst information. The horizontal blanking on the line 98 also is applied to the Nand gate 97.

The Nand gate 97 operates conventionally to provide the output waveform on line 75 as shown in FIG. 10F which comprises mixed blanking which is positive going for the circuit illustrated. Whenever both inputs to the gate 97 are ones, its output is a zero, and whenever either input to the gate 97 is a zero, its output is a one which is inverted with respect to the input. Waveforms 95a and 98a illustrate example inputs for several individual pulses applied to the input of the gate. A longer term waveform is seen in FIG. 10F. The waveform on the output line 75 is applied to the video processing portion of the video processing and output amplifier 46, and will be described in more detail in the discussion of Figures 11a and 11b.

Considering now the decoding process, and turning again to FIG. 2, the vertical pulses from the sync logic 42 on the line 76 are applied to the counters and drivers circuit 50, and the decade counter circuit thereof counts these vertical pulses to keep track of the incoming video fields. A detailed block diagram of the counters and drivers is shown in FIG. 7, as well as the decode switch and logic circuit 52. Various of the waveforms involved are illustrated in FIG. 10.

Turning to FIG. 7, the counters comprise three decade counters 104–106, comprising "units", "tens" and "hundreds" decade counters, respectively. The vertical pulses as shown in FIG. 10E are applied by input line 76 to the units decade counter 104, and the output of this counter is applied by a line 107 to the tens decade counter 105, the output of which is applied by a line 108 to the input of the hundreds decade counters 106 in a conventional manner. The four outputs of each of these three counters 104–106 are applied to respective 7-segment drivers 110–112. All of the counters and 7-segment drivers may be integrated into one or more integrated circuit chips. The counters 104–106 count the incoming pulses in a conventional manner and provide outputs to the drivers 110–112 also in a conventional manner to represent the instantaneous count held at any time by the counters. The 7-segment drivers 110–112 also are conventional and are normally used for energizing combinations of the seven segments of a 7-segment visual display like that shown in FIG. 7a.

Thus, each driver 110–112 has seven outputs 1–7 which normally are used in electronic equipment to energize the like numbered segments of a 7-segment display of the type illustrated in FIG. 7a. However, in the present system, these seven outputs of each driver 110–112 are applied to a decode card reader or selector switches. FIG. 7 shows, for simplicity of illustration, selector switches 114 through 116, each of which comprises seven input terminals connected with the respective outputs of the drivers 110–112, and two output terminals which are connected to the following logic circuits. Also shown diagrammatically for illustrative purposes are respective movable contacts on each switch 114–116 to connect any one of the 7 outputs of the drivers to output terminals. The drivers used alternatively may be for a different number of segments (e.g., 10, 16), in which case they are used in a similar manner. As will be explained later, the movable contacts represent selectable switch contacts or electrical connections made or enabled by a decode card. The output logic to be described below takes the signals at the outputs of the switches 114–116 and generates the necessary signals to allow normal video fields to pass and to reinvert those video fields which were transmitted as inverted.

The selector switch 114 is shown as including output terminals 114a and 114b connected with respective movable contacts 114c and 114d. The output terminal 114a of the selector switch 114 is connected to one input of a Nor gate 120, and an output terminal 115a of selector switch 115 is connected to the other input of this gate. The output of the Nor gate 120 is connected to an And gate 121, the output of which is connected to a Nor gate 122. The output of the Nor gate 122 is connected to an input of an exclusive Or gate 123. The second output 114b of the selector switch 114 is connected to one input of an Or gate 124. The second output 115b of the selector switch 115 is connected to the second input of the Nor gate 122. The first output 116a of the selector switch 116 is connected to the second input of the Or gate 124, and the second output 116b of switch 116 is connected to the second input of the exclusive Or gate 123. The output of the exclusive Or gate 123 is connected to an inverter 126, the output of which is connected by a line 128 to a second inverter 127, and these inverters comprise gate keyers which provide outputs on respective lines 129 and 130 which control the analog gates 53 and 54, respectively, shown in FIG. 2.

The decade counters 104–106 thus count at the vertical field rate and, therefore, effectively count the incoming fields, and the outputs of the drivers 110–112 are high or low depending upon the instantaneous count. The logic comprising the gates 120–124 and 126–127 serves to further decode the selected outputs of the drivers 110–112 which are in use at the time to thereby provide the necessary signals which either allow normal video fields to pass through the circuit without change, or to reinvert the video fields which existed as inverted fields in the codified video.

Figure 8:
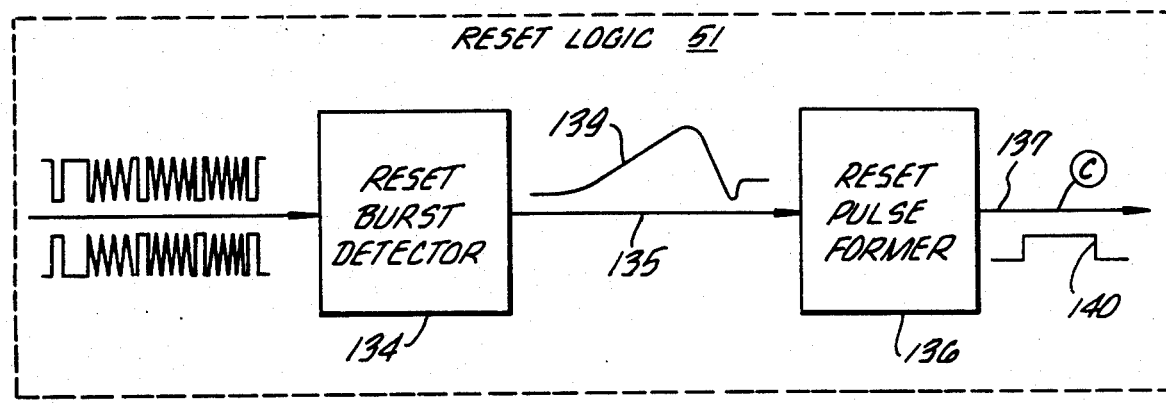
FIG. 8 is a detailed block diagram of the reset logic of the system of FIG. 2 for resetting the decade counters.

The decade counters 104–106 are reset at predetermined intervals (such as, approximately every one thousand fields). The reset logic 51 (FIG. 2) is shown in detail in FIG. 8, and includes a reset burst detector 134 having its output 135 connected to a reset pulse former 136, the output 137 of which is connected to the reset inputs of the decade counters 104–106. The reset burst detector 134 is similar to the sync burst detector 78 of FIG. 6, but it is slower, meaning that it takes many more input pulses to provide its output pulse. It comprises a tuned amplifier filter or a high Q amplifier including suitable capacitance to take a relatively long time to charge as compared to the circuit of the sync burst detector 78 of FIG. 6. It responds to the reset burst pulses 67 shown in FIGS. 5b and 5c, and generates a ramp forming a pulse 139 as shown in FIGS. 5d and 8. In a preferred embodiment, the reset burst 67 (FIGS. 5b–5c) is transmitted in the vertical interval approximately every one thousand fields or at a 16.66 second rate to provide the pulse 139. This pulse is applied to a reset pulse former 136 which forms this pulse into a clean reset pulse 140 which is applied by the line 137 to the reset input of the decade counters 104–106. A sample reset pulse 140 is depicted in FIG. 10C in relation to the 102nd field and other exemplary pulses throughout the system for illustrative purposes; however, it normally would occur at or near the 1000th field. Thus, the decade counters 104–106 count the vertical pulses (FIG. 10E) to thereby count each video field, and these counters are reset typically after one thousand fields. It should be noted that the reset pulses need not occur at the same field number each time, and the actual field at which reset occurs can be varied as an added step of security since a subscriber's decoder still will follow reset whenever it occurs and a pirate's may not.

The manner in which inverted video fields are reinverted under control of the decode switch and logic 52 will now be described with reference to FIG. 2 and FIG. 11a. While the decoding process will be described in greater detail, it is assumed for purposes of this description that the selector switches 114–115 have been appropriately set or the appropriate conductive paths have been provided via a decode card and card reader. This set up is possible because it is known at the transmitting facility which fields are inverted, and the necessary information, as will be described later, is provided via the decode card or otherwise provided to the subscriber. The video amp and phase splitter 45 of FIG. 2 has an in-phase output on line 70 and a 180-degree phase output on line 71. Example waveforms are shown respectively in FIGS. 10H and 10G and it will be noted that they are 180 degrees out-of-phase. The circuit of the video amp and phase splitter 45 is shown in FIG. 11b and will be described later. Thus, the in-phase video fields are applied to the analog gate 54 of FIG. 2 and the out-of-phase video fields are applied to the analog gate 53. These two gates are controlled from the decode switch and logic 52 via the lines 130 and 129. Example control signal waveforms are shown in FIGS. 10Y and 10X. So long as the video fields exist as normal fields in the codified video, they are passed by the lower analog gate 54 which passes the in-phase signals and the gate 53 is disabled at this time. Whenever a field in the codified video is an inverted field and is to be reinverted, the upper gate 53 is enabled to pass the out-of-phase field or fields and the lower gate 54 is disabled. Thus, considering the waveforms in FIGS. 10X and 10Y, the lower gate 54 is enabled or "on" during fields 89 through 99 and 110–111 (waveform 10H) since the Y signal of FIG. 10Y is high, and this gate therefore passes all these negative going video fields without change. This gate 54 is disabled or "off" during fields 100–109, but the upper gate 53 is "on" as can be seen from the high X signal of FIG. 10X. Thus, at this time, the out-of-phase output of the video amp and phase splitter 45 on line 71 is used which results in fields 100–109 being passed in inverted form (negative going - FIG. 10G). FIGS. 10G and 10H respectively show the out-of-phase video and in-phase video on respective output lines 71 and 70 of the video amp and phase splitter 45. Accordingly, fields 89 through 99 of the waveform of FIG. 10H are passed through the analog gate 54 to the video processing and output amp 46, as are fields 110–111, and fields 100–109 of the waveform of FIG. 10G are passed through the gate 53 to the video processing and output amp 46. All these video fields are combined at input 146 of the video processing and output amplifier 46, and the combined waveform is shown in FIG. 10I. This waveform has all fields going in the same direction (white negative direction), or aligned, now and thus the video has been decoded, but standard sync and pedestal have not been reinserted.

FIG. 11a illustrates the video processing and output amplifier 46 in more detail, and the same comprises a video processing amplifier and inverter 46a and a video output amplifier 46b. The output I (aligned fields) from the analog gates 53–54 is applied on input line 146 to the video processing amplifier and inverter 46a, and the mixed blanking signals F from line 75 of the sync logic 42 of FIG. 2 and FIG. 6 is applied through a variable resistance 148 for setting the blanking level or pedestal in a conventional manner. The waveform on line 75 is illustrated in FIG. 10F. The output of the video processing amplifier and inverter 46a is applied by a line 149 to the video output amplifier 46b. This output includes the video fields but all now reinverted to positive-going (or normal; namely in correct phase with each field as the waveform 2a entered the encoder of the transmitter at Terminal 2 in FIG. 1) and with blanking as shown in FIG. 10J. This signal is received by the video output amplifier 46b which also receives the mixed vertical and horizontal sync as seen in FIGS. 10D and 10D' on line 74 through a sync amplitude controlling variable resistance 150. The output amp 46b serves as an impedance matching stage and for isolation, and also to add sync back to the video signal. A zener diode 151 serves as a sync clipper or clamp. In the event color burst was stripped earlier in the system, it likewise can be reinserted at this stage in a manner similar to the sync addition process just described. The output of the video output amplifier 46b is provided on the output line 47 and is now fully restored composite video as illustrated in FIGS. 10K and 10K'. This composite video is applied to the video modulator 48 of FIG. 2, and this is a standard modulator which receives the composite video and amplitude modulates the same upon a suitable RF carrier for television channels 2 through 83, usually channel 3 or channel 4. The output of the modulator 48 is illustrated in FIG. 10L which shows the full RF envelope which is supplied to the antenna terminals of a conventional television receiver 30.

Turning now to a more detailed description of the decoding process of the present invention, the same has been generally described with reference to FIG. 7, but now will be described in greater detail. The use of decade counters, 7-segment drivers and the associated logic provides a particularly advantageous system inasmuch as the components are readily available and relatively inexpensive. The decade counters and drivers are found in many hand calculators, and because of the large volume production of such devices the component cost can be low. Similarly, the selector switches or selectors 114-116 can be selector switches as shown, but preferably they comprise decode card completed electrical paths such as via physical electrical contacts through use of punched cards. More preferably, the selectors comprise capacitively completed contacts wherein the 7 outputs of each of the drivers 110-112 and the output terminals 114a-114b, 115a-115b and 116a-116b comprise capacitor plates, and metal segments and conductors within a laminated decode card form the electrical connections between selected plates as diagrammatically indicated by the movable arms 114c-114d, 115c-115d and 116c-116d of the switches 114-116. Other forms of cards could be used, such as magnetic or inductive. Thus, the selectors 114-116 enable a particular numerical combination to be selected which is a tier code number related to a similar tier number code used at the transmitting facility for selecting which fields are inverted.

Figure 9A:
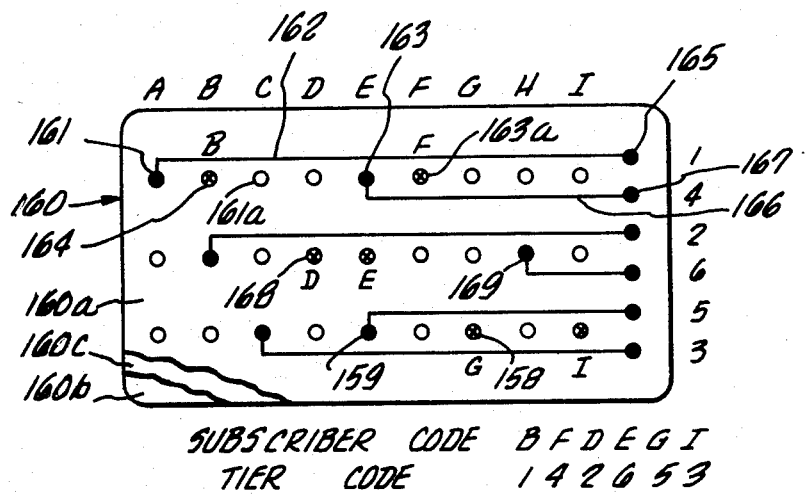
FIGS. 9A–9C illustrate an exemplary decode card and example equivalent electrical circuits.

An example decode card is shown in FIG. 9a for a tier code number 142653. This card is supplied by the subscription TV company, and this may be for the programming for a given month. In the exemplary embodiment, this code number indicates that output terminal 114a of selector switch 114 is connected to output terminal 1 of the 7-segment driver 110, output terminal 114b is connected to output terminal 4 of the driver 110, output terminal 115a is connected to output terminal 2 of driver 111, output terminal 115b is connected with output terminal 6 of the driver 111, output terminal 116a is connected with output terminal 5 of the driver 112, and output terminal 116b is connected with output terminal 3 of driver 112. If actual selector switches 114-116 are used as shown in FIG. 7, the subscription TV company supplies the number itself, without supplying a decode card, and the movable contacts thereof are set by the subscriber to complete the connections in this manner. If a capacitive decode card such as shown in FIG. 9a is used, its metallic elements complete like electrical connections, it being understood that the frequency of the signals to be passed is selected (as by using a suitable oscillator or oscillators) to be appropriate for use with the capacitance involved in the card and card reader. Alternatively, instead of switching being accomplished by capacitive thru connections, it can be done via capacitive shunts to ground (which shunts are removed as necessary to unground signals so as to pass them to suitable bistable devices which, in turn, provide signals to the decode logic). Waveforms as shown in FIGS. 10M through 10W are involved in the present decode logic example. Waveforms of 10M through 10R show the signals on the respective output terminals 114a, 114b, 115a, 115b, 116a, and 116b resulting from the selected driver outputs of the drivers 110-112. These signals represent the signals (high and low or ones and zeros) from the drivers 110-112 which conventionally energize the various segments of the 7-segment displays like that shown in FIG. 7a which, in a counter or calculator, are connected to each of the respective drivers 110-112. The code pattern which results from the drivers is shown in Table I below.

TABLE I

| | | Arabic Numbers Indicated | | | | | | | | | |
|---|---|---|---|---|---|---|---|---|---|---|---|
| | | 0 | 1 | 2 | 3 | 4 | 5 | 6 | 7 | 8 | 9 |
| 7-Segment | 1 | 1 | 1 | 1 | 1 | 1 | 0 | 0 | 1 | 1 | 1 |
| Driver | 2 | 1 | 1 | 0 | 1 | 1 | 1 | 1 | 1 | 1 | 1 |
| Outputs | 3 | 1 | 0 | 1 | 1 | 0 | 1 | 1 | 0 | 1 | 1 |
| For segments | 4 | 1 | 0 | 1 | 0 | 0 | 0 | 1 | 0 | 1 | 0 |
| 1-7 | 5 | 1 | 0 | 0 | 0 | 1 | 1 | 1 | 0 | 1 | 1 |
| | 6 | 1 | 0 | 1 | 1 | 0 | 1 | 1 | 1 | 1 | 1 |
| | 7 | 0 | 0 | 1 | 1 | 1 | 1 | 1 | 0 | 1 | 1 |

Table I above in the left hand column identifies the seven segments 1-7 of a 7-segment display of the type shown in FIG. 7a and which segments are energized to present a visual display of the arabic numbers 0-9 shown across the top of the Table. Thus, for example, to indicate the numeral 8, all seven segments 1-7 are energized. It will be noted from Table I that different ones of the seven segments 1-7 are energized to indicate any given arabic number 0-9, and that the code applied to the seven segment display for any given number differs from the other numbers, and therefore is a discrete code for each arabic number. Thus, the first segment 1 is energized when the arabic numbers 0 through 4 and 7-9 are to be displayed. Instead of using the driver outputs to drive a 7-segment display, these outputs are used herein as discrete codes, and this enables a relatively simple decoding scheme to be devised for reinverting the inverted video fields.

A detailed description and example with respect to the decoding process is given below with an example decode number 142653. The 1 represents the first segment output of the units driver 110, the 4 represents the fourth segment output of this driver 110, the 2 stands for the second segment output of the tens driver 111, the 6 stands for the sixth segment output of the driver 111, the five represents the fifth segment output of the hundreds driver 112, and the 3 stands for the third segment output of the driver 112. The first segment output of the driver 110 will be high whenever the unit's counter 104 has a count of 0-4 or 7-9 as can be seen from Table I. Similarly, the fourth segment output of the unit's driver 110 will be high whenever the counter 104 has a count indicating 0, 2, 6 or 8 as indicated from Table I. The other numerals of the decode number 142653 represent other outputs of the drivers 111-112 to be used in the decode process. Thus, the decode number represents the outputs of the driver 110-112 to be used to thereby provide the basic decoding signals for the following logic gates so that the inverted fields of the codified video can be appropriately reinverted. It should be noted that by using the two outputs from each of the drivers for the respective decade counters, it is the equivalent of using six decade counters instead of three. The outputs of each switch (eg, 114*a* and 114*b*) may be connected to any two of the seven (1-7) outputs of the drivers (eg, 110) and, also, the two outputs of any one or more of the switches may be connected to the same driver output since the following logic circuits connected to the outputs of each switch is different. For example, switch output 114*a* of switch 114 can be connected to output number 1 of the driver 110 as shown in FIG. 7, and switch output 114*b* could be connected to this same output number 1 of the driver 110 instead of driver output number 4 as shown. Furthermore, the inverse of the outputs of the drivers 110–112 also can be used to provide more decode combinations. With the counter arrangement as shown in FIG. 7 any units count (e.g. 0) from counter 104 repeats at 1/6 second intervals since the counter 104 counts each field 0–9. The tens count from 105 repeats at a 1⅔ second rate since it counts every tenth field 10–90, and the hundreds count from 106 repeats at a 16⅔ second rate since it counts every hundreth field 100–900. More decade counters could be used to provide more codes, but three appear to be ample.

Turning again to the logic gates 120–123, the Nor gate 120 provides a one output only when both of its inputs are zeros, and provides a zero output in all other cases. The waveform of FIG. 10S shows an example output for video fields 89–111, and it will be noted that it is a zero for all of these particular fields. Because of the logic of an Nor gate, its output is zero approximately 75% of the time. The Or gate 124 provides a one output (approximately 75% of the time) whenever either of its inputs is a one, and the output of the Or gate 124 for fields 89–111 is shown in FIG. 10T. The And gate 121 provides a one output whenever both of its inputs are ones, and the waveform of FIG. 10U illustrates its output for fields 89–111. It will be noted that its output in this example is zero inasmuch as the output shown in FIG. 10S is zero during these fields. The Nor gate 122 provides a one output when both of its inputs are zero. Its output is illustrated in FIG. 10V, and it will be noted that its output is one for fields 110–111 when its input shown in FIG. 10P is a zero (and its input shown in FIG. 10U is a zero continuously for fields 89–111). The exclusive Or 123 provides a one output whenever its inputs are different, and only provides a zero output when both of its inputs are ones or both are zeros (the exclusive Or 123 acts as a gated pulse phase inverter to add complexity and further security against piracy). Its output is shown in FIG. 10W. Its inputs are the waveforms shown in FIG. 10V and in FIG. 10R, the waveform shown in 10R possibly changing from high to low about every 1.66 seconds because of the nature of the decade counting scheme. The output from the exclusive Or 123 is applied to the inverter 126, which in turn is connected to the inverter 127 as described earlier. These inverters provide the control signals as shown in FIGS. 10X and 10Y to the analog gates 53 and 54 to control the gating through of normal video fields and the reinversion of the inverted video fields from the codified video.

From the foregoing discussions of the decoding logic and process it should now be apparent that a certain number of fields out of a given number of fields (such as 1000 fields) can be codified and transmitted in an inverted form, and depending upon the sequence of normal and inverted fields in the codified video, a code number (such as the example 142653) can be used in the decode selector (whether the decode selector comprises actual selector switches 114–116 or a decode card system) to simply identify and reinvert the inverted fields so as to enable normal composite video to be developed for the television receiver. If decode cards are used, which are preferable, a card for the coming month's programming can be mailed to the subscriber, and use of this card in the decoder will allow the subscriber to view that month's programming. Different cards can be provided for special events, such as sporting events, first-run movies, and so forth and, in this case, different fields of the codified video will be inverted for these events, and the special event card will be codified appropriately for receiving that special event and no other. This decoding process allows any number of tiers of programming to be codified separately and still be received by subscribers who have either obtained the appropriate decode cards or decode code.

FIG. 9*a* illustrates an exemplary decode card 160. The card may be similar in size to a conventional credit card, and it has an inner layer 160*a* as seen in FIG. 9*a* and is covered with opaque bottom and top surfaces 160*b* and 160*c* on both sides, respectively. Either outer surface may be printed with any suitable information, such as the tier of programming for which the card is used. The inner layer of the card has three rows of circles, any one of which may be printed or otherwise formed during manufacture with a metalic pad 161 to serve as a capacitive plate. Two of the circles in each row are blank and not used (B and F in the top row, D and E in the middle row, and G and I in the bottom row). These blank circles provide the subscriber code (in this case, BFDEGI) which enables over forty-six thousand code possibilities for the subscribers, and reduces the chance that one subscriber's card can be used on another subscriber's receiving and decoding system (because a card with an incorrect subscriber's code will not properly coincide with the active capacitor plates in the card reader of another subscriber, and this substantially reduces a "skeleton key" approach to decoding in this system). The card also is printed with further metallic pads to provide a tier code (example, 142653), to thereby provide a card for the television viewing for the coming month (or, alternatively, for all of the sports programming for the month or season, a first-run movie or movies, a prize fight, and so on). The top row of the inner layer 160*a* of the card 160 is printed with metallic circles 161 and 163 and metallic electrical conductors 162 and 166. The coding is such that for the numeral 1 of the code 142653, the first available circle 161 in the first row is used and printed. The next digit, 4, means that the fourth available circle 163 is used (ignoring the B circle 164 in the top row since this is part of the subscriber code and is not used or otherwise metallicly printed). The conductors 162 and 166 are printed connected to printed metallic terminals 165 and 167 at the right edge of the card. The metallic printed circles which are used for this particular subscriber's card are all shown darkened in in FIG. 9*a*, and each forms a plate of a capacitor which, in association with similar plates of a card reader, provides the electrically conductive paths diagrammatically indicated by the switch contacts (e.g., 114*c* and 114*d*) of the selector switches 114–116 of FIG. 7.

Figure 9B:
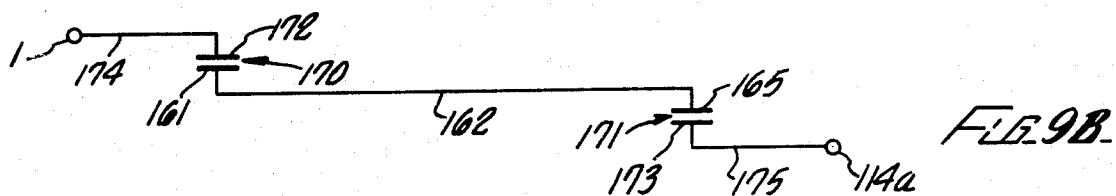
Figure 9C:
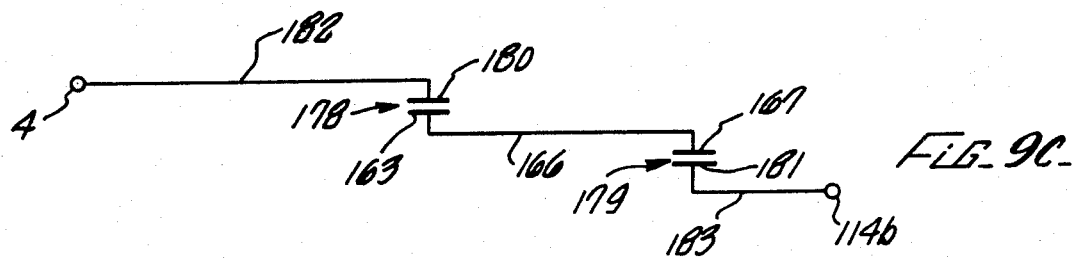

FIGS. 9b and 9c illustrates the equivalent electrical circuit for the first row of metallic circles of the card shown in FIG. 9a, the other rows being similar. The metallic circle or plate 161 of the card in FIG. 9a forms a lower plate of a capacitor 170 in FIG. 9b, and this plate is connected by the conductor 162 to the metallic circle 165 on the card to form the upper plate of a second capacitor 171. An upper plate 172 of the capacitor 170, and a lower plate 173 of the capacitor 171 are metallic discs or plates in the body of the card reader (and are represented in FIG. 7 by respective output terminals 1 and 4 of the driver 110) and overlie the respective discs 161 and 163 when the card of FIG. 9a is inserted into the card reader. The plate 172 is a similar metallic disc and is connected by an electrical conductor 174 to the first terminal 1 of the 7-segment driver 110 of FIG. 7. Similarly, the lower plate 173 of the capacitor 171 likewise is a metallic disc and is connected by an electrical conductor 175 to the output terminal 114a of the selector switch 114 of FIG. 7. In a similar manner, the metalic circle 163 of the card in FIG. 9a forms the lower plate of a capacitor 178, and this plate is connected by the card conductor 166 to the disc 167 which forms the upper plate of a capacitor 179. As was the case with the electrical circuit of FIG. 9b, an upper plate 180 of the capacitor 178 and a lower plate 181 of the capacitor 179 are part of the card reader. The plate 180 is connected by an electrical conductor 182 to the fourth output terminal 4 of the driver 110. The plate 181 of the capacitor 179 is connected to the output terminal 114b of the selector switch 114. The remaining metallic circles in the second and third rows and the edge connector circles for the card of FIG. 9a have similar equivalent electrical diagrams. It will be apparent that the use of a card of the nature of FIG. 9a allows selectable connections to be made between the outputs of the drivers 110-112 and the output terminals 114a-114b, 115a-115b, and 116a-116b so that the appropriate signals can be supplied to the associated logic gates 120-124, it being apparent to those skilled in the art that the signals supplied by the drivers (or oscillator signals gated out by the drivers) are selected to be of a suitable frequency with respect to the amount of capacitance involved between the card and card reader.

It will be appreciated that the card readers for each of about forty-six thousand subscribers are different since no capacitor plates are provided (or not used, if they are physically provided in the reader) in the card reader adjacent the blank circles (e.g., BFDEGI) corresponding to the subscriber code. Another subscriber, for example, may have the code ABABAB in which case the first two circles in each row of the card of FIG. 9a are not used, and the tier code 142653 would use in FIG. 9a circles 161a (for the 1) and 163a (for the 4) in the first row, circles 168 and 169 (for 2 and 6) in the second row and the two circles 158 and 159 as shown (for 5 and 3) in the third row.

FIG. 11b is a circuit diagram of an exemplary video amplifier and phase splitter 45 (FIG. 2), video processing amplifier and inverter 46a (FIG. 11a) and video output amplifier 46b, as well as the analog gates 53-54 (FIG. 2). As previously described, the coded video B is applied via the line 44 to the video amplifier and phase splitter 45 from the video distribution amplifier 41 (FIG. 2). The video amplifier and phase splitter is a relatively simple transistor circuit using an NPN transistor 200 which provides in-phase video at the emitter on line 201 and 180 degree out-of-phase video at the collector on line 202. These signals are capacitively coupled by capacitors 203-204 to the respective analog gates 54 and 53. These analog gates comprise a pair of high-speed switching diodes connected as shown, and are gated on and off by the signals on lines 129-130. If the transmitted video field is an inverted (negative-going) field it is passed by the lower gate 54. If the transmitted field is normal (positive going), then it is passed 180 degrees out-of-phase (inverted) by the upper gate 53. Thus, the output I on the line 146 comprises all inverted (negative going) and aligned video fields, and these signals are applied to the video processing amplifier and inverter 46a which was previously discussed in connection with the description of FIG. 11a. This circuit also receives the mixed blanking signal F on the input line 75 to apply a hard clamp to the video waveform if color burst is to be restored (or apply a soft clamp if the color burst is to be passed undistorted). The blanking (set up or pedestal) is adjustable by the potentiometer 148. The video on the line 146 is applied through a small capacitor 207 to remove DC and low frequency and AC hum components from the video. The variable resistance 148 is part of a biasing circuit and allows the pedestal level to be selected. An RC circuit 208 allows a good sharp waveform to be obtained so as to pass all the high frequencies as well as the low frequency information contained in the mixed blanking signals from line 75. Whenever a positive blanking pulse is applied to the variable resistor 148, it causes the capacitor 207 to go to ground and discharge and thereby provides an exact DC reference. Thus, a hard clamp to video is provided to keep it at a particular reference level, and removes any difference between the DC level as a result of switching of the video fields by the analog gates 53 and 54. The resulting signal is applied to a transistor inverting amplifier 209 which provides as an output the waveform shown in FIG. 10J. This output is applied to the video output amplifier 46b which comprises an emitter follower 211 which is simply an impedance matching stage and a stage for adding sync back into the signal from the line 74. The sync signal from the line 74 is applied through a resistor 212 so negative sync can be added at the variable resistor 150. The zener diode 151 provides a hard clamp on the video signal to clean up the sync and keep it at the right level. The output on the line 47 is applied to the video modulator 42 (FIG. 2).

Turning now to the audio system of FIG. 12, FIGS. 12a and 12b illustrate respectively an FM stereo passband for conventional FM stereo broadcasts and a conventional television sound (FM) broadcast. It will be noted that the bandpass in the latter is relatively limited. FIG. 12c shows a preferred subscription television stereo FM passband which can be used with the system of the present invention, and also can be used with other audio systems. It will be noted that it has a substantially wider passband than the conventional television sound system, even though it is more limited than conventional FM stereo. Suitable filters are used which suppress only the upper sideband information from signals which amplitude modulate a (suppressed) 38 kHz carrier in a conventional manner. That is, in this system the passband is like that in a stereo FM broadcast, except that the double-sideband (DSB) information normally transmitted around the upper 38 kHz point has been limited to a signal-sideband (SSB) as lower-sideband (LSB) transmission only, and that normally transmitted around the lower 38 kHz point has been limited to a single-sideband (SSB) as upper-sideband (USB) transmission only. A conventional stereo FM receiver will receive the information as depicted in FIG. 12c with no difficulty. It is believed that the passband of FIG. 12c will be acceptable to the FCC since the FCC states that satisfactory transmitter operation is to be maintained from −40 khz to +40 khz for television audio transmission. Further limiting of the passband can be achieved by eliminating all the information transmitted around the lower 38 kHz point to thereby limit the transmission to about 60 kHz total.

It should be noted that in a conventional FM stereo system, the signals transmitted are L+R on the main carrier, and L−R on the subcarrier (note FIG. 12a). In the receiver, a matrix provides L+R to both channels if it is a monaural transmission. If it is a stereo transmission, the main carrier plus subcarrier is received equalling L+R+L−R=2L÷2=L for the left channel; and then main carrier minus L=R for the right channel. The transmission is different in the present system wherein L−R is broadcast on the main channel and L+R is broadcast on the subcarrier. A conventional TV receiver will receive nothing from a monaural broadcast by the present system (since L−R=0, or substantially zero), and will receive only a relatively thin L−R signal from a stereo broadcast.

FIG. 12d illustrates a preferred switching arrangement for the right speaker of a stereo FM receiver so as to enable reception of different forms of audio transmissions with the present subscription television system. The switching arrangement accommodates stereo and monaural broadcasts while rejecting barker channel. The proposed subscription stereo audio transmission of FIG. 12c discussed above results in a −R signal to the right channel speaker in a stereo broadcast, and a −(L+R) to the right channel speaker in a monaural broadcast. This can result in a phasing problem referred to as motorboating or result in an audio dead area in the vicinity of the center of the space between the speakers.

Accordingly, a mode selector switch is provided as shown in FIG. 12d for the right channel speaker 241. The left channel speaker 242 is connected to the stereo FM receiver 37 in a conventional manner. The switch 240 is a three-position switch having selectable positions A, B, and C. In position A, the system is connected for conventional FM, monaural or stereo reception, over the usual FM band. In position B, the right speaker phase is reversed to compensate for the subscription TV (−R) in the stereo mode and −(L+R) in the monaural mode. In position C, the right speaker is disconnected from the barker (B) contaminated right channel output of the receiver 37 and, instead is connected in parallel across the left channel output. At the transmitting facility, the following signal is sent, including barker: Main carrier—barker; subcarrier—L+R−Barker. Therefore, the left channel receives the main carrier plus the subcarrier=(B)+(L+R−B)=L+R. Accordingly, the left and right speakers both provide an L+R output (since the right speaker is connected in parallel with the left speaker) in switch position C. On the other hand, since barker is transmitted over the main carrier, a conventional television receiver will receive only the barker information. The switching operation of the switch 240 can be accomplished electronically, as by using a subaudable or supersonic tone transmitted on the barker channel to effect switching to position C. Such a tone could also be audable to provide an irritation to nonsubscribers if desired. Similarly, some left plus right signal could, if desired, be placed on the main (barker) channel as a teaser, with no degregation to the audio signal received by subscribers. Furthermore, because of the addition of the switch 240 an added complication for the layman exists with respect to recording of the television audio. It should be noted that other more restricted passbands could be used for the audio signals conveyed in the present system, but it still is preferred to transmit L−R on the main carrier and L+R on the subcarrier.

Figure 12F:
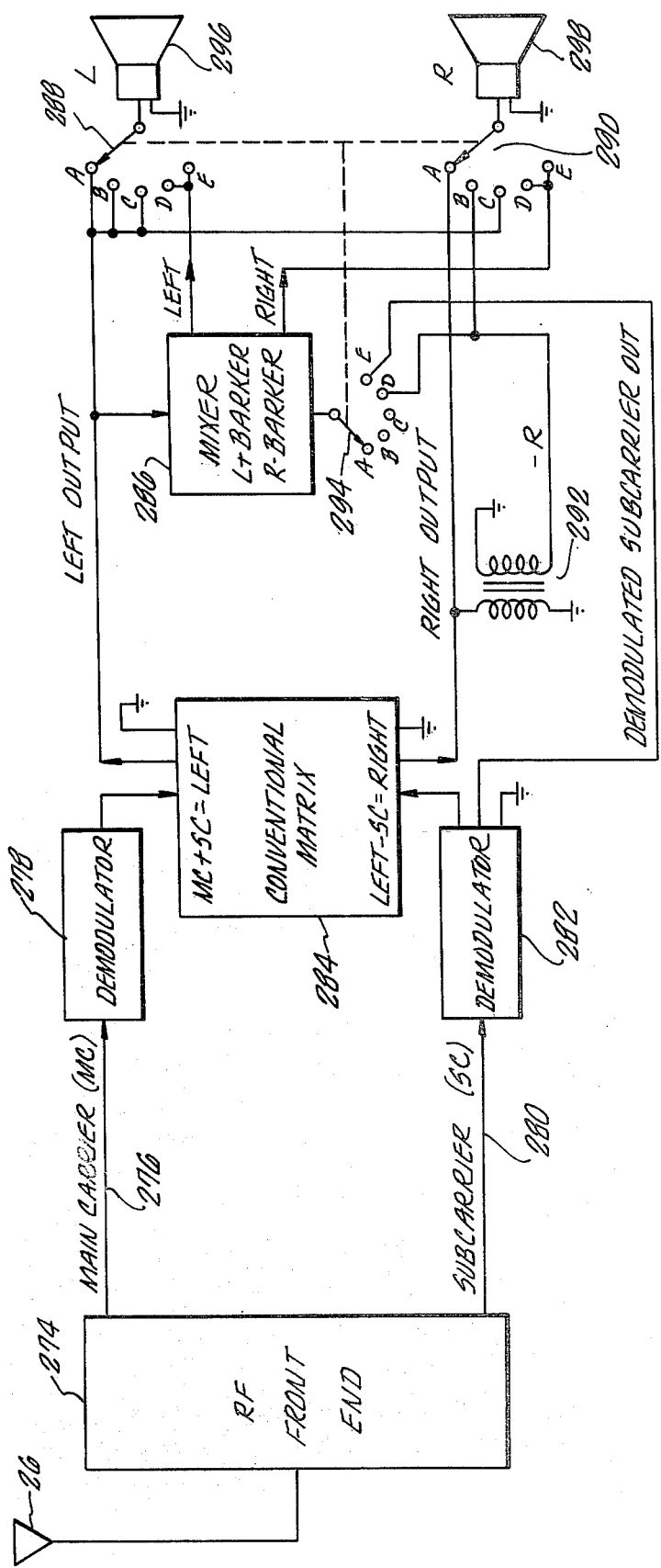
Figure 12G:
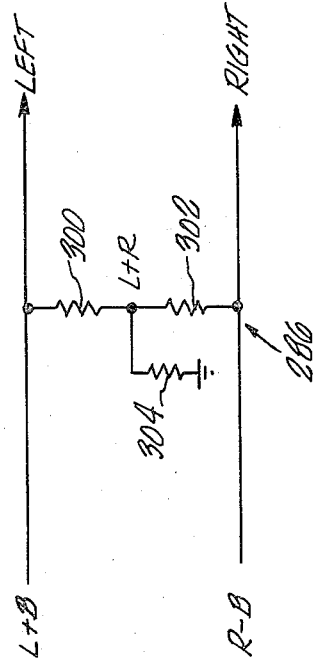

With respect now to FIGS. 12E-12G, these figures illustrate additional audio encoding schemes which can implemented using techniques similar to those described above. In FIG. 12E a matrix 250 receives the audio left channel program input at 13 and the audio right channel program input at 14 while a barker input is provided at 15. The matrix 250 is of a conventional design and combines the inputs to provide a left (L) plus right (R) output 252, a left minus right output 254, a barker (B) output 256, and a left plus right minus barker output 258, similar to the matrix 12 of FIG. 1. The matrix 250 also generates a left minus right plus two barker output 260, and a right minus barker output 262. These outputs are connected to ganged selector switches 264 and 268 which in turn supply a main carrier modulator input on a line 270 and a subcarrier modulator input on a line 272 to the FM stero generator 24 as seen in FIG. 1. The generator 24 in turn provides the output on the line 11 to the TV transmitter 9 as described hereinbefore.

When the selector switchs 264 and 268 are in positions A, B, or C, the main carrier and the subcarrier provide the conventional stereo, encoded stereo or monaural signals in the same manner as described above. Similarly, when the switchs 264 and 268 are in the D position, another form of encoded stereo is provided wherein the L−R+2B is on the main carrier and the L+R is on the subcarrier. Finally, by placing the switches 264 and 268 in the E position, encoded stereo is broadcast with L−R+2B on the main carrier an R−B on the subcarrier. The D and E positions thus provide two additional versions of encoded stereo which may be received and decoded as described with reference to FIG. 12F.

A receiver as shown in FIG. 12F is preferably directly tunable to the audio portion of the transmitted STV signal. In such an instance, the converter 34 and the audio system 28 of FIG. 2 is replaced by the receiver of FIG. 12F.

An antenna which may be the antenna 26, is connected to an RF front end 274 tunable to the audio signal frequency of the transmitted STV signal that is to be decoded. The RF front end 274 provides a main carrier (MC) output via a line 276 to a first demodulator 278 and a subcarrier (SC) output on a line 280 to a second demodulator 282. The demodulators 278 and 282 provide demodulated MC and SC outputs respectively to a conventional FM stereo matrix 284. The matrix 284 in turn combines the MC and SC signals to provide a left output (MC+SC=L) signal and a right output (L−SC=R) signal. The left output signal is applied to a mixer 286 and is also applied to A, B, and C terminals of a five-position switch 288 and a C terminal of a five-position switch 290.

The right output signal from the matrix 284 is connected to the primary winding of a phase-inverting transformer 292, the secondary winding of which provides an inverted right (−R) signal to a D terminal of a third five-position switch 294 and to a B terminal of the switch 290. The switches 288, 290 and 294 are ganged to rotate simultaneously. It is to be noted that these switches may form a portion of the card and card reader system described above with reference to FIG. 9 so as to allow a decode card to make the proper switch selection. The switches 288 and 290 provide outputs to a left speaker 296 and a right speaker 298 respectively.

When the switches 264 and 268 (FIG. 12E) and the switches 288, 290 and 294 (FIG. 12F) are both in one of the respective positions A, B, or C, the circuitry operates as described previously to provide (a) conventional stereo, (b) STV stereo or (c) monaural audio as discussed previously with reference to FIG. 12D. However with the switches 264, 268, 288, 290 and 294 in the D position, the MC signal, as described previously, has L−R+2B while the SC signal has L+R imposed thereon. The MC and SC signals when processed by the matrix 284, result in the left output signal comprising L+B information while the right output signal comprises B−R information. The right output signal, as inverted by the transformer 292, thus connects a signal with R−B information to the mixer 286. The mixer 286 may comprise a conventional resistor mixing network (FIG. 12G) including series-connected resistors 300 and 302 across which signals comprising the L+B and R−B components are connected. A third resistor 304 is connected between the common node of the resistors 300 and 302, and ground. The mixer 286, upon mixing the applied signals, eliminates the B component of the two signals while providing left and right signals to the switches 288 and 290, respectively. It is to be noted that the left and right signals from the mixer 286 are no longer pure stereo signals, but instead are slightly mixed such that the left signal includes a portion of the right signal while the right signal includes a portion of the left signal. The resulting audio from the speakers 296 and 298 is thus a somewhat mixed stereo effect, although completely suitable for STV purposes.

Lastly, with the switches 264, 268, 288, 290 and 294 all set to the E position, a demodulated subcarrier signal from the demodulator 282 is connected through an E terminal of the switch 294 to the mixer 286. From the discussion above of FIG. 12E, it is to be noted that the subcarrier comprises R−B information. The mixer 286 then mixes this subcarrier signal with the left output signal comprising L+B information to provide left and right signals to the speakers 296 and 298. As with the encoding decoding process carried out with the switches in the D position, the left and right signals from the mixer 286 are no longer substantially pure stereo but are instead slightly mixed but the barker audio is eliminated from the resulting signals.

While the video encoding system has been described with reference to FIG. 1, and the particular manner of encoding will be fully understood therefrom and from the preceding discussion of the receiving and decoding system and the various waveforms involved, for the sake of completeness a detailed block diagram of the encoder of FIG. 1 is illustrated in FIG. 13. In many respects, the encoder is substantially identical to portions of the decoding system. Thus, the encoder 7 shown in FIG. 13 includes a video encoder 7a which receives the non-composite video input from input 2. The video encoder 7a is similar to the video amp and phase splitter 45 and analog gates 53-54 of FIG. 11b, along with the counting, driving and decoding logic of FIG. 7. The video in comprises aligned video fields and these are applied to a video amplifier and phase splitter in the video encoder 7a like that of 45 of FIG. 11b which, in turn, feeds a pair of analog gates like the gates 53-54 of FIG. 11b. Counters, drivers, and logic like 50 and 52 of FIG. 7 drive these analog gates, and their outputs are combined to provide a codified video output wherein the fields now are codified or non-aligned (some of the fields are positive going and some are negative going, or normal and inverted). This codified video is applied to a blanking reference circuit 7b which receives a blanking input 7e. The blanking reference is similar to the blanking adder of the video processing amp 46a of FIG. 11b, except instead of providing blanking above a black reference it sets a point in the middle of the video. The blanking signal applied to input 7e is a blanking or drive type signal which, when present establishes a reference level in the middle of the video (that is, it establishes a mid grey instead of a black reference, like the reference level of −0.5 as seen in the waveforms of FIG. 4b and 4c). Additionally, if desired the blanking signals can be wide enough so that the color burst (e.g., 63, 63a of FIGS. 4b-4c) can be inserted at the mid grey or 0.5 reference level also instead of where shown in FIGS. 4b-4c. The purpose of allowing the color burst to be inserted about this mid reference point is to eliminate the chance that a pirate can detect the pedestal level of the color burst to thereby attempt to determine if the transmitted video fields are normal or inverted. In this case, the entire horizontal blanking level (including front porch and back porch) can be at the mid or −0.5 point to enhance the security of the system (in which case the color burst signals 63 and 63a in FIGS. 4b-4c would swing about the −0.5 level as seen in these Figures). The signal from the blanking reference 7b is applied to a terminal 7i.

The encoder 7 of FIG. 13 also includes a sync burst flag adder 7c and a reset burst flag adder 7d, both of which function in a similar manner. The adder 7c receives sync burst from an input terminal 7f, and as described earlier this preferably is a 3.15 MHz signal like 61 and 61a shown in FIGS. 4b-4c and 61 in FIGS. 5b-5c. The adder 7c is a gate wherein each sync pulse from input 3 gates through a number of the cycles of the sync burst, and then these sync burst cycles are added to the overall signal from the blanking reference 7b at the junction 7i. In a similar manner, the reset burst flag adder receives on input terminal 7g a reset burst which, as described previously preferably is 3.8 MHz, and also receives a reset pulse train on an input 7h. The pulses in the reset pulse train occur about every 1000 fields and last for about three to four horizontal line intervals on the back porch of the vertical interval. Thus, each reset pulse on input 7h gates through a number of cycles of the reset burst on input 7g to gate through reset bursts like 67 of FIGS. 5b-5c which are combined with the overall signal at terminal 7i. The terminal 7i is connected to the upper terminal 5b of the switch 5 of FIGS. 13 and 1 to allow the codified video to be applied via line 6 to the television transmitter 9 of FIG. 1.

While preferred embodiments of the present invention have been described and illustrated, various modifications will be apparent to those skilled in the art and it is intended to include all such modifications and variations within the scope of the appended claims.

I claim:

1. A television system in which the television signals are transmitted in codified form as codified video and wherein certain predetermined video fields out of each group of a given number of video fields are inverted and other video fields are normal video fields comprising means for receiving the codified video, means for detecting sync information in the codified video and developing vertical pulses for each vertical interval, decade counting means for counting said pulses, said decade counting means being reset substantially upon the occurrence of each said group of video fields, driver means connected with the decade counting means and having a plurality of outputs for providing selectable output code signals as a function of the instantaneous count held by the decade counting means, decoding means for selecting certain outputs of the driver means for providing control signals for identifying whether each field of the received codified video comprises a normal video field or an inverted video field, and switching means responsive to the control signals for passing normal video fields and for reinverting those video fields which exist as inverted video fields in the codified video.

2. A system as in claim 1 wherein
said decoding means comprises a plurality of selector switch means connected with outputs of said driver means.

3. A system as in claim 1 wherein
said decoding means comprises decode card means having information encoded therein for enabling outputs of said driver means to be selected.

4. A system as in claim 1 wherein
said decade counting means comprises three decade counters, and said driver means comprises three seven-segment drivers connected respectively to outputs of said decade counters.

5. A system as in claim 1 wherein said codified video includes codified sync information, and said system further includes
means for detecting said codified sync information and for recovering sync information, and
means for receiving from said switching means the passed normal video fields and reinverted video fields, and for receiving said recovered sync information and reinserting sync signals with the normal and reinverted video fields to provide a composite video output for use by a television receiver.

6. A system as in claim 5 wherein
said sync information comprises a sync burst flag in place of each conventional horizontal sync pulse of a standard television signal, and includes vertical sync burst flags included in a vertical sync interval with the vertical sync burst flag having a longer duration than the horizontal sync burst flag, and further includes reset burst flags in selected vertical intervals of a discernible signal characteristic different from the horizontal and vertical sync burst flags, and
reset means responsive to the reset burst flags for providing reset pulses to said decade counting means at approximately the completion of each said group of video fields.

7. A system as in claim 6 wherein the horizontal sync burst flags and vertical sync burst flags have a zero base line in the video region so that maximum sync burst flag excursion will take place within the normal modulation confines of the video picture information in the video fields.

8. A system as in claim 7 wherein
said horizontal and vertical sync burst flags have a frequency of approximately 3.15 MHz.

9. A system as in claim 8 wherein
said discernible signal characteristic of said reset burst flags is frequency.

10. A system as in claim 1 wherein
each said group of a given number of video fields comprises approximately one thousand video fields.

11. A system as in claim 1 wherein
FM stereo audio is transmitted with said codified video on a conventional carrier frequency with left minus right on a main carrier and with left plus right on a subcarrier.

12. A system as in claim 11 including
audio converter means for recovering audio from the television signals, and
stereo audio receiver means for receiving the recovered audio, said stereo audio receiving means including left and right channel output means with switching means in the right channel output means for enabling selection between conventionally broadcast FM stereo audio and said audio transmitted in said system.

13. A television system in which the television signals are transmitted in codified form as codified video and wherein certain predetermined video fields out of each group of video fields are inverted and other video fields are normal video fields comprising
means for receiving the codified video,
means for detecting sync information in the codified video and developing vertical pulses for each vertical interval,
counting means for counting said pulses, said counting means being reset substantially upon the occurrence of each said group of video fields, said counting means having a plurality of outputs for providing selectable output code signals as a function of the instantaneous count held by the counting means,
decoding means for selecting certain outputs of the driver means for providing control signals for identifying whether each field of the received codified video comprises a normal video field or an inverted video field, and
switching means responsive to the control signals for passing normal video fields and for reinverting those video fields which exist as inverted video fields in the codified video.

14. A system as in claim 13 wherein
said counting means comprises a plurality of decade counters, and includes a like plurality of seven-segment drivers for providing said selectable output code signals, and
said decoding means comprises decode card means having information encoded therein for selecting said output code signals.

15. A system as in claim 13 wherein said codified video includes sync burst flags, and said system further includes
means for detecting said sync burst flags and for recognizing sync information, and
means for receiving from said switching means the passed normal video fields and reinverted video fields, and for receiving said recovered sync information and reinserting sync signals with the normal and reinverted video fields to provide a composite video output for use by a television receiver.

16. A system as in claim 13 wherein
said sync information in the codified video comprises sync burst flags of the same phase in each of the normal and inverted video fields.

17. A system as in claim 13 wherein
each group of video fields comprises a variable number of fields and said counting means is reset after the receipt of a variable number of video fields.

18. A television system in which the television signals are transmitted in codified form as codified video and wherein certain predetermined video fields out of each group of a given number of video fields are inverted and other video fields are normal video fields, and wherein said codified video includes codified sync information, comprising
means for receiving the codified video,
means for detecting said codified sync information in the codified video and developing pulses for each vertical interval, said sync information comprising a sync burst flag in place of conventional horizontal sync pulses of a standard television signal, and including vertical sync burst flags included in a vertical sync interval with the vertical sync burst flag having a duration different from the horizontal sync burst flag, and further including reset burst flags in the vertical interval and having a discernible signal characteristic different from the horizontal and vertical sync burst flags,
a plurality of decade counting means for counting said pulses, said decade counting means being reset substantially upon the occurrence of each said group of video fields,
driver means connected with the decade counting means and having a plurality of outputs for providing selectable output code signals as a function of the instantaneous count held by the decade counting means,
decoding means for selecting certain outputs of the driver means for providing control signals for identifying whether each field of the received codified video comprises a normal video field or an inverted video field,
switching means responsive to the control signals for passing normal video fields and for reinverting those video fields which exist as inverted video fields in the codified video, and
reset means responsive to the reset burst flags for providing reset pulses to said decade counting means at approximately the completion of each said group of video fields.

19. A system as in claim 18 wherein
FM stereo audio is transmitted with said codified video on a conventional carrier frequency with left minus right on a main carrier and with left plus right on a subcarrier,
audio converter means for recovering audio from the television signals, and
stereo audio receiver means for receiving the recovered audio, said stereo audio receiving means including left and right channel output means with switching means in the right channel output means for enabling selection between conventionally broadcast FM stereo audio and said audio transmitted in said system.

20. A system as in claim 18 wherein
each said group of a given number of video fields comprises approximately one thousand video fields,
said horizontal and vertical sync burst flags have a frequency of approximately 3.15 MHz.
said discernible signal characteristic of said reset burst flags is frequency.

21. A method of decoding television signals which are transmitted in codified form as codified video and wherein certain predetermined video fields out of each group of a given number of video fields are inverted and other video fields are normal video fields comprising
receiving the codified video,
detecting sync information in the codified video and developing pulses related to the video fields received,
counting said pulses, and restarting counting of said pulses substantially upon the occurrence of each said group of video fields,
developing selectable output code signals as a function of the number of pulses counted,
selecting certain of the output code signals and providing control signals for identifying whether each field of the received codified video comprises a normal video field or an inverted video field, and
passing normal video fields and reinverting those video fields which exist as inverted video fields in the codified video in response to said control signals.

22. A system as in claim 21 wherein
said pulses are counted by decade counters, and said selectable output code signals are derived from driver means connected with outputs of said decade counters.

23. A system as in claim 21 wherein
said sync information comprises horizontal sync burst flags in place of conventional horizontal sync pulses of a standard television signal, and
said horizontal sync burst flags occur in each video field and have the same phase for normal and inverted video fields.

24. A television system in which the television signals are transmitted in codified form as codified video and wherein certain video fields are of a first type of video fields and certain predetermined second type of video fields out of each group of video fields are inverted with respect to the first type of video fields comprising
means for receiving the codified video,
means for detecting sync information in the codified video and developing vertical pulses for each vertical interval,
counting means for counting said pulses, said counting means being reset substantially upon the occurrence of each said group of video fields, said counting means having a plurality of outputs for providing selectable output code signals as a function of the instantaneous count held by the counting means,
decoding means for selecting certain outputs of the driver means for providing control signals for identifying whether each field of the received codified video comprises a first type of video field or a second type of video field, and
switching means responsive to the control signals for passing the first type of video fields and for reinverting those second type of video fields which exist in the codified video.

25. A system as in claim 24 wherein the first type of video fields comprise normal video fields and wherein said counting means comprises a plurality of decade counters, and includes a like plurality of seven-segment drivers for providing said selectable output code signals, and said decoding means comprises decode card means having information encoded therein for selecting said output code signals.

26. A television system in which the television signals are transmitted in codified form as codified video and wherein FM stereo audio is transmitted on a conventional carrier frequency with said codified video, said FM stereo audio comprising left minus right on a main carrier and left plus right on a subcarrier, audio converter means for recovering audio from the television signals, and stereo audio receiver means for receiving the recovered audio, said stereo audio receivor means including left and right channel output means with switching means in the at least one said channel output means for enabling selection between conventionally broadcast FM stereo audio and said FM stereo audio transmitted in said system.

27. A television system in which the television signals are transmitted in codified form as codified video and wherein an FM audio signal is broadcast with said codified video, said FM audio signal comprising a main carrier and a subcarrier, said system including transmitter means responsive to a left channel, a right channel and a barker channel for transmitting one of at least several matrixed combinations of said left, right and barker channels, said matrixed combinations including (1) said main carrier comprising said barker channel and said subcarrier comprising said left channel with said right channel and with said barker channel, said barker channel having a predetermined phase relationship with respect to said left and right channels; (2) said main carrier comprising said left channel with said right channel having a first predetermined phase relationship therebetween, and said subcarrier comprising said left channel with said right channel having a second predetermined relationship therebetween; (3) said main carrier comprising said left channel with said right channel having a first predetermined phase relationship therebetween and with said barker channel, said barker channel having a predetermined amplitude and phase relationship with respect to said left channel, and said subcarrier comprising said left channel with said right channel having a second predetermined phase relationship therebetween; (4) or said main carrier comprising said left channel with said right channel having a first predetermined phase relationship therebetween and with said barker channel, said barker channel having a predetermined amplitude and phase relationship with respect to said left channel, and said subcarrier comprising said right channel with said barker channel, said subcarrier right and barker channels having predetermined phase and amplitude relationships with respect to said main carrier right and barker channels; and receiver means for receiving the FM audio signal, said receiver means including means for providing a main carrier demodulated output and a subcarrier demodulated output, and matrix means for selectably combining said main carrier demodulated output with said subcarrier demodulated output and for providing an audio output including at least one of said left or right channels, said audio output being substantially free of said barker channel.

28. A television system in which the television signals are transmitted in codified form as codified video and include codified picture information and codified sync information and wherein the codified picture information includes normal video fields and abnormal video fields comprising means for receiving the codified video and decoding the picture information, means for detecting sync information in the codified video and developing sync pulses, said sync information comprising horizontal sync burst flags in place of conventional horizontal sync pulses of a standard television signal, and said horizontal sync burst flags having a zero base line in the video region so that maximum sync burst flag excursion will take place within the normal modulation confines of the video picture information, said means for detecting sync information in the codified video and developing sync pulses develops vertical sync pulses for each vertical interval of the television signals, and said means for receiving the codified video and decoding the picture information includes decade counting means for counting said vertical sync pulses, said decade counting means being reset substantially after each predetermined group of video fields of the television signals occurs, driver means connected with the decade counting means and having a plurality of outputs for providing selectable output code signals as a function of the instantaneous count held by the decade counting means, decoding means for selecting certain outputs of the driver means for providing control signals for identifying whether each field of the received codified video comprises a normal video field or an abnormal video field, and switching means responsive to the control signals for combining the normal video fields and the abnormal video fields in an aligned fashion.

* * * * *

UNITED STATES PATENT AND TRADEMARK OFFICE
CERTIFICATE OF CORRECTION

PATENT NO. : 4,471,379
DATED : September 11, 1984
INVENTOR(S) : KENNETH D. STEPHENS It is certified that error appears in the above-identified patent and that said Letters Patent are hereby corrected as shown below:

Column 1, lines 5-11 are deleted.

Column 6, lines 15 and 17, "highquality" should read
--high-quality--

Column 8, line 30, "negativegoing" should read
--negative-going--

Column 13, line 34, the number 114 in "114b" should not be italicized.

Signed and Sealed this

Twelfth Day of August 1986

[SEAL]

Attest:

DONALD J. QUIGG

Attesting Officer

Commissioner of Patents and Trademarks